United States Patent
Muraji et al.

(10) Patent No.: US 9,211,860 B2
(45) Date of Patent: Dec. 15, 2015

(54) KNEE SIDE FACE RESTRAINT AIRBAG DEVICE

(71) Applicant: Toyota Jidosha Kabushiki Kaisha, Toyota-shi Aichi-ken (JP)

(72) Inventors: Masao Muraji, Miyoshi (JP); Masayuki Yoshikawa, Toyota (JP); Kosuke Taguchi, Okazaki (JP); Kohei Ozawa, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/151,316

(22) Filed: Jan. 9, 2014

(65) Prior Publication Data

US 2014/0197622 A1 Jul. 17, 2014

(30) Foreign Application Priority Data

Jan. 16, 2013 (JP) .................. 2013-005656
Jan. 24, 2013 (JP) .................. 2013-011528
Jan. 24, 2013 (JP) .................. 2013-011529

(51) Int. Cl.
*B60R 21/206* (2011.01)
*B60R 21/231* (2011.01)
*B60R 21/21* (2011.01)
*B60R 21/205* (2011.01)
*B60R 21/207* (2006.01)

(52) U.S. Cl.
CPC ............. *B60R 21/206* (2013.01); *B60R 21/21* (2013.01); *B60R 21/23138* (2013.01); *B60R 21/205* (2013.01); *B60R 21/207* (2013.01); *B60R 2021/23169* (2013.01)

(58) Field of Classification Search
CPC ........... B60R 21/206; B60R 21/23138; B60R 2021/23169; B60R 2021/0051
USPC .................... 280/730.2, 730.1, 732
See application file for complete search history.

(56) References Cited

U.S. PATENT DOCUMENTS

| | | | | |
|---|---|---|---|---|
| 3,747,952 A | * | 7/1973 | Graebe | 280/730.1 |
| 4,925,209 A | * | 5/1990 | Sakurai | 280/728.3 |
| 5,324,070 A | * | 6/1994 | Kitagawa et al. | 280/730.1 |
| 5,575,497 A | * | 11/1996 | Suyama et al. | 280/730.1 |
| 5,678,852 A | * | 10/1997 | Brown et al. | 280/730.2 |
| 2004/0026905 A1 | * | 2/2004 | Kim et al. | 280/730.2 |
| 2008/0122205 A1 | | 5/2008 | Imamura et al. | |

FOREIGN PATENT DOCUMENTS

| | | | |
|---|---|---|---|
| DE | 10311006 A1 | * | 9/2004 |
| DE | 102009050968 A1 | * | 6/2010 |
| FR | 2865171 A1 | * | 7/2005 |
| GB | 2340458 A | * | 2/2000 |
| JP | H05-345555 A | | 12/1993 |
| JP | H09-95200 A | | 4/1997 |
| JP | 2003-327073 A | | 11/2003 |

(Continued)

*Primary Examiner* — Ruth Ilan
(74) *Attorney, Agent, or Firm* — Dinsmore & Shohl LLP

(57) ABSTRACT

A knee side face restraint airbag device comprising an inflator that generates gas upon actuation; and a knee side face restraint airbag that is disposed in a folded state at an outside in a vehicle width direction at an inside of a vehicle interior member, that inflates and deploys towards a vehicle cabin inside upon being supplied with gas generated from the inflator, and that restrains an outer lateral-side of a knee of a seated occupant.

9 Claims, 17 Drawing Sheets

(56) References Cited

FOREIGN PATENT DOCUMENTS

| | | |
|---|---|---|
| JP | 2005-145381 A | 6/2005 |
| JP | 2008-037276 A | 2/2008 |
| JP | 2008-126974 A | 6/2008 |
| JP | 2008-174210 A | 7/2008 |
| JP | 2008-184149 A | 8/2008 |
| JP | 2008-265660 A | 11/2008 |
| JP | 2012-121572 A | 6/2012 |

* cited by examiner

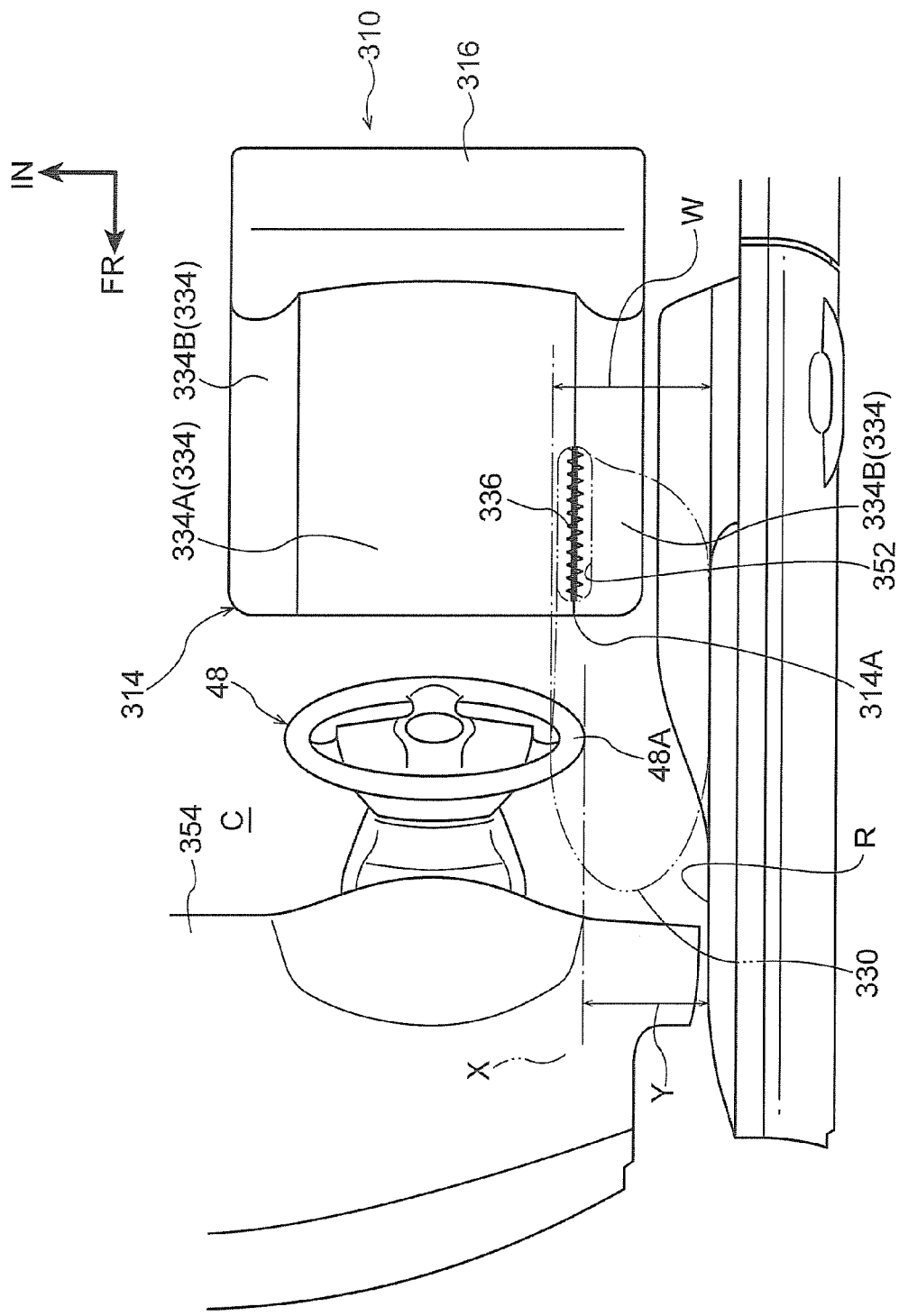

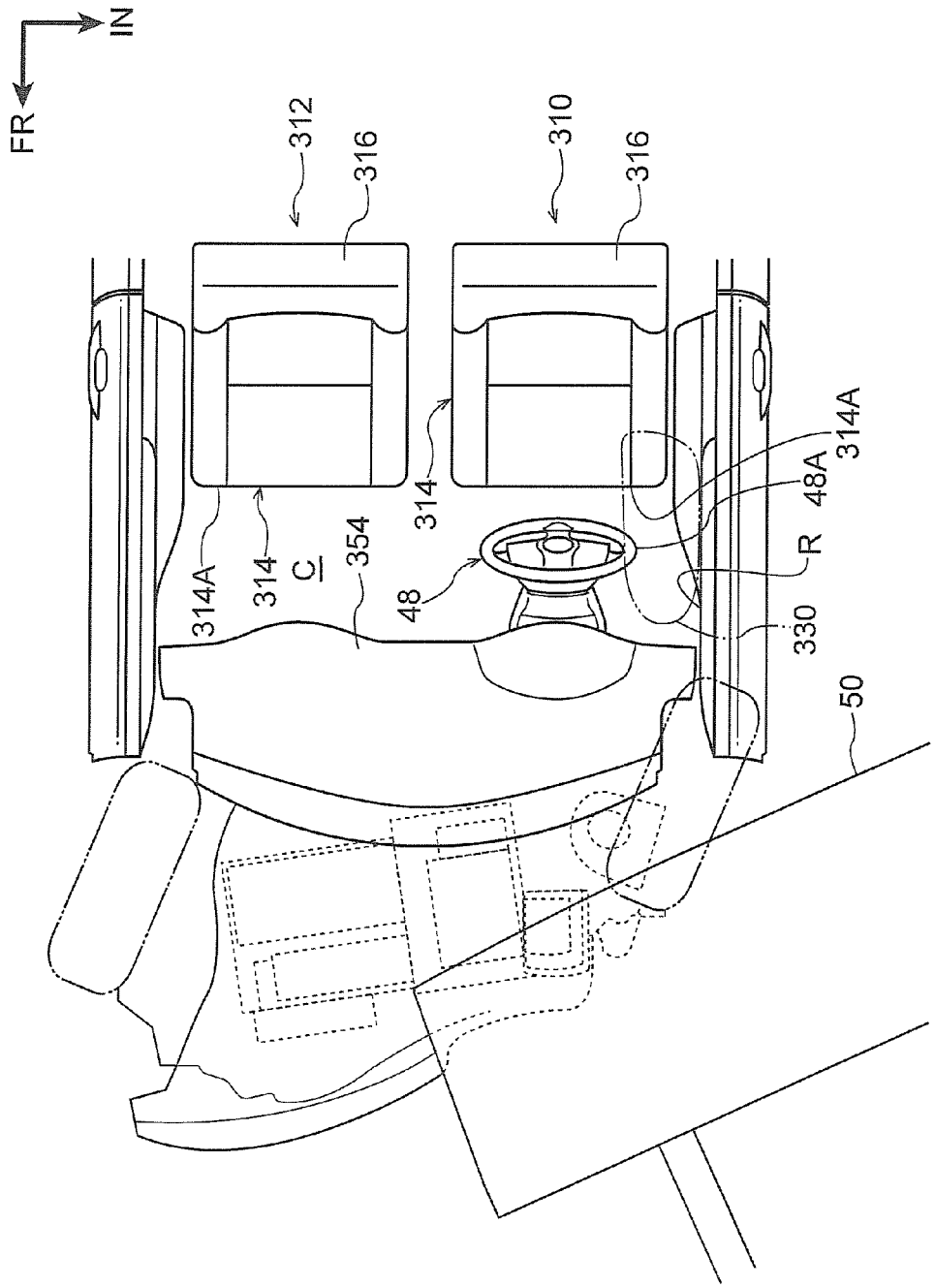

KNEE SIDE FACE RESTRAINT AIRBAG DEVICE

CROSS-REFERENCE TO RELATED APPLICATION

This application claims priorities under 35 USC 119 from Japanese Patent Applications No. 2013-005656 filed on Jan. 16, 2013, No. 2013-011528 filed on Jan. 24, 2013, and No. 2013-011529 filed on Jan. 24, 2013, the disclosures of which are incorporated by reference herein.

BACKGROUND

1. Technical Field

The present invention relates to a knee side face restraint airbag device.

2. Related Art

Japanese Patent Application Laid-Open (JP-A) No. 2003-327073 discloses technology relating to a vehicle occupant protection device that aims to precisely determine the collision type in the event of a vehicle collision and restrain an occupant in an optimum state according to the collision type. In this technology, a thigh support, shin support and foot support that act as supports to restrain sideways motion of an occupant during an oblique collision, are formed as projection portions to a door trim so as to suppress in-out rotation of the foot (twisting of the ankle).

However, in JP-A No. 2003-327073 the supports are formed to the door trim as projection portions, and sideways motion of the leg is not restrained until the thigh, shin or foot come into contact with the door trim. This means that in practice the knee of the occupant moves towards the vehicle width direction outside by a distance of an initial gap (cabin space) between the knee and the door trim, making twisting of the ankle of the occupant possible.

In consideration of the above circumstances, the present invention provides a knee side face restraint airbag device that can reduce or prevent twisting of the ankle of an occupant in the event of a frontal collision (in particular in the event of a small overlap collision or an oblique collision).

SUMMARY

A first aspect of the present invention is a knee side face restraint airbag device including: an inflator that generates gas upon actuation; and a knee side face restraint airbag that is disposed in a folded state at a vehicle width direction outside at an inside of a vehicle interior member, that inflates and deploys towards a vehicle cabin inside upon being supplied with gas generated from the inflator, and that restrains an outer lateral-side of a knee of a seated occupant.

A second aspect of the present invention is the knee side face restraint airbag device of the first aspect, wherein: the knee side face restraint airbag is disposed in a folded state within a door trim of a side door, inflates and deploys from the door trim towards the vehicle cabin inside upon being supplied with gas generated from the inflator, and restrains the outer lateral-side of the knee of the seated occupant.

A third aspect of the present invention is the knee side face restraint airbag of the second aspect, wherein: an airbag module configured so as to include the inflator and the knee side face restraint airbag is supported by an impact beam that is disposed between a door outer panel and a door inner panel of the side door.

A fourth aspect of the present invention is the knee side face restraint airbag device of the second aspect, wherein: a speaker is installed to the side door; and the knee side face restraint airbag is configured so as to inflate and deploy from a speaker installation location towards the vehicle cabin inside.

A fifth aspect of the present invention is the knee side face restraint airbag device of the first aspect, wherein: a thickness along the vehicle width direction of the knee side face restraint airbag when inflated and deployed is set so as to be a distance from a door trim design face to the outer lateral-side of the knee of the seated occupant or greater.

A sixth aspect of the present invention is the knee side face restraint airbag device of the first aspect, wherein: the knee side face restraint airbag is configured such that when inflated and deployed, the knee side face restraint airbag covers at least an area of up to and including a radius of 100 mm centered on a position located 200 mm further towards a vehicle rear and 500 mm further towards a vehicle top than an intersection point of a foot rest provided in a foot space and a floor panel.

A seventh aspect of the present invention is the knee side face restraint airbag device of the fourth aspect wherein: the knee side face restraint airbag removes or destroys a speaker grille portion of the speaker provided in a door trim design face and is inflated and deployed towards the vehicle cabin inside.

An eighth aspect of the present invention is the knee side face restraint airbag device of the first aspect, wherein: the knee side face restraint airbag is disposed in a folded state at an vehicle width direction outside at an inside of an instrument panel, is inflated and deployed from a design face of the instrument panel towards a vehicle rear and a diagonal lower side upon being supplied with gas generated from the inflator, and restrains the outer lateral-side of the knee of the seated occupant.

A ninth aspect of the present invention is the knee side face restraint airbag device of the eighth aspect, wherein: an airbag module configured so as to include the inflator and the knee side face restraint airbag is disposed within the instrument panel and is supported through a bracket by an instrument panel reinforcement that extends along the vehicle width direction.

A tenth aspect of the present invention is the knee side face restraint airbag of the eighth aspect, wherein in a vehicle installed state, a length along a vehicle up-down direction of the knee side face restraint airbag when the knee side face restraint airbag is inflated and deployed is set to be twice a thickness along the vehicle width direction of the knee side face restraint airbag or greater.

An eleventh aspect of the present invention is the knee side face restraint airbag device of the eighth aspect, wherein the knee side face restraint airbag does not contact a front end portion of a seat cushion of a vehicle seat on which the occupant sits when inflated and deployed.

A twelfth aspect of the present invention is the knee side face restraint airbag device of the eighth aspect, wherein the knee side face restraint airbag abuts a front end portion of a seat cushion of a vehicle seat on which the occupant sits when inflated and deployed.

A thirteenth aspect of the present invention is the knee side face restraint airbag device of the first aspect, wherein the knee side face restraint airbag is disposed in a folded state at a vehicle width direction outside at an inside of a cover of a seat cushion of a vehicle seat on which the occupant sits, causes the cover of the seat cushion to split, inflates and deploys towards a vehicle front side upon being supplied with gas generated from the inflator, and restrains the outer lateral-side of the knee of the seated occupant.

A fourteenth aspect of the present invention is the knee side face restraint airbag device of the thirteenth aspect, wherein: an airbag module configured so as to include the inflator and the knee side face restraint airbag is attached through a bracket to a seat cushion frame that supports the seat cushion.

A fifteenth aspect of the present invention is the knee side face restraint airbag device of the thirteenth aspect wherein: the cover is configured such that it includes an upper face portion on which the occupant sits, and a side face portion disposed at an outside in the vehicle width direction of the upper face portion; the knee side face restraint airbag is configured such that it splits a sewn portion that runs in the vehicle front-rear direction at a boundary location between the upper face portion and the side face portion, and is inflated and deployed towards a vehicle front side; and the sewn portion is set to run through from a front side portion of the boundary location between the upper face portion and the side face portion of the seat cushion so as to extend past an upper side front end corner portion when running from a seatback side.

In the knee side face restraint airbag device according to the first aspect, gas is generated by actuation of the inflator. This gas is supplied to the inside of the knee side face restraint airbag that is disposed in the vehicle interior member in a folded state. The knee side face restraint airbag is thus inflated and deployed towards the vehicle cabin inside from to surface of the vehicle interior member.

In the knee side face restraint airbag device according to the second aspect, gas is generated by actuation of the inflator. This gas is supplied to the inside of the knee side face restraint airbag that is disposed in the side door in a folded state. The knee side face restraint airbag is thus inflated and deployed towards the vehicle cabin inside from door trim of the side door.

Normally, in the event that a small overlap collision or a collision from an oblique direction (an oblique collision) was happened at a seated occupant side, the knee of the seated occupant would move sideways towards the vehicle width direction outside where the collision occurred. However, in the present invention, the outer lateral-side of the knee of the seated occupant is restrained by the knee side face restraint airbag that inflates and deploys from the door trim of the side door towards the vehicle cabin inside. Twisting of the ankle of the seated occupant is suppressed or prevented as a result.

In the knee side face restraint airbag device according to the third aspect, the impact beam is disposed between the door outer panel and the door inner panel of the side door, and the airbag module is attached to the impact beam. Thus, a reaction force is supported by the impact beam during inflation and deployment of the knee side face restraint airbag.

In the knee side face restraint airbag device according to the fourth aspect, the speaker is installed to the side door, and the knee side face restraint airbag is inflated and deployed from the speaker installation location towards the vehicle cabin inside. There is accordingly no need to provide a dedicated airbag door, enabling a simpler design.

In the knee side face restraint airbag device according to the fifth aspect, the thickness along the vehicle width direction of the knee side face restraint airbag when inflated and deployed is set so as to be a distance from a door trim design face to the outer lateral-side of the knee of the seated occupant or greater. The knee side face restraint airbag accordingly has sufficient thickness to receive the knee side face of the seated occupant. A reaction force that restrains the outer lateral-side of the knee of the seated occupant can accordingly be obtained at an early stage in the event of a frontal collision such as a small overlap collision or an oblique collision.

In the knee side face restraint airbag device according to the sixth aspect, the knee side face restraint airbag is configured such that when inflated and deployed, the knee side face restraint airbag covers at least an area of up to and including a radius of 100 mm centered on a position located 200 mm further towards the vehicle rear and 500 mm further towards the vehicle top than the intersection point of the footrest provided in the foot space and the floor panel. The knee side face of a seated occupant can accordingly be restrained even in vehicles of various vehicle concepts.

In the knee side face restraint airbag device according to the seventh aspect, the knee side face restraint airbag removes or destroys a speaker grille portion of the speaker provided in a door trim design face and is inflated and deployed towards the vehicle cabin inside. There is therefore no need to provide a dedicated airbag door at the door trim design face, enabling the design of the door trim to be simplified.

In the knee side face restraint airbag device according to the eighth aspect, gas is generated by actuation of the inflator. This gas is supplied to the inside of the knee side face restraint airbag that is disposed in a folded state at the vehicle width direction outside at the inside of the instrument panel. The knee side face restraint airbag can thus be inflated and deployed from the design face of the instrument panel towards the vehicle rear and the diagonal lower side.

Normally, in the event that a small overlap collision or a collision from an oblique direction (an oblique collision) was happened at a seated occupant side, the knee of the seated occupant would move sideways towards the vehicle width direction outside where the collision occurred. However, in the present invention, the outer lateral-side of the knee of the seated occupant is restrained by the knee side face restraint airbag that inflates and deploys from the design face of the instrument panel towards the vehicle rear and the diagonal lower side. Twisting of the ankle of the seated occupant is suppressed or prevented as a result.

In the knee side face restraint airbag device according to the ninth aspect, the instrument panel reinforcement extends along the vehicle width direction inside the instrument panel and the airbag module is supported through a bracket by the instrument panel reinforcement. Reaction force during inflation and deployment of the knee side face restraint airbag is thereby adequately supported by the instrument panel reinforcement.

In the knee side face restraint airbag device according to the tenth aspect, in the vehicle installed state, the length in the vehicle up-down direction of the knee side face restraint airbag when the knee side face restraint airbag is inflated and deployed is set to be twice the thickness along the vehicle width direction of the knee side face restraint airbag or greater. Configuration can therefore be made with a knee side face restraint airbag of thin design.

In the knee side face restraint airbag device according to the eleventh aspect, the knee side face restraint airbag does not contact the front end portion of the seat cushion of the vehicle seat on which the occupant sets when inflated and deployed, enabling the length of the knee side face airbag along the vehicle front-rear direction to be made shorter. The knee side face restraint airbag is accordingly reduced in size, reducing the gas capacity.

In the knee side face restraint airbag device according to the twelfth aspect, the knee side face restraint airbag abuts a front end portion of a seat cushion of a vehicle seat on which the occupant sets when inflated and deployed. The knee side face restraint airbag can accordingly obtain a reaction force from the front end portion of the seat cushion. The knee side face restraint airbag thereby functions as a "wall" that restrains the knee side face.

In the knee side face restraint airbag device according to the thirteenth aspect, gas is generated by the actuation of the inflator. This gas is supplied to the inside of the knee side face restraint airbag that is disposed in a folded state at the vehicle width direction outside at the inside of the cover of the seat cushion of the vehicle seat on which the occupant sits. As a result, the cover of the seat cushion splits, and the knee side face restraint airbag is inflated and deployed from the cover of the seat cushion towards the vehicle front side.

Normally, in the event that a small overlap collision or a collision from an oblique direction (an oblique collision) was happened at a seated occupant side, the knee of the seated occupant would move sideways towards the vehicle width direction outside where the collision occurred. However, in the present invention, the outer lateral-side of the knee of the seated occupant is restrained by the knee side face restraint airbag that inflates and deploys from the cover of the seat cushion towards the vehicle front side. Twisting of the ankle of the seated occupant is suppressed or prevented as a result.

In the knee side face restraint airbag device according to the fourteenth aspect, the vehicle seat is provided with the seat cushion frame that supports the seat cushion, and the airbag module is attached to the seat cushion frame through the bracket. Reaction force during inflation and deployment of the knee side face restraint airbag is thereby adequately supported by the seat cushion frame.

According to the knee side face restraint airbag of the fifteenth aspect, the cover of the seat cushion is configured including the upper face portion on which an occupant sits, and the side face portion disposed at the outside in the vehicle width direction of the upper face portion. The sewn portion is moreover disposed running in the vehicle front-rear direction at the boundary location between the upper face portion and the side face portion. The knee side face restraint airbag, therefore splits the sewn portion between the upper face portion and the side face portion, and inflates and deploys towards the vehicle front side so as to follow the thigh of the seated occupant.

Moreover, in the present invention, the sewn portion is set to run through from a front side portion of the boundary location between the upper face portion and the side face portion of the seat cushion so as to extend past the upper side front end corner portion when running from a seatback side. The knee side face restraint airbag is thereby inflated and deployed so as to pass from a location slightly to the rear side of the knee side face of the seated occupant along a route that is nearly the shortest route towards the vehicle front side.

As described above, the knee side face restraint airbag device of the first aspect has the excellent advantageous effect of being able to reduce or prevent twisting of the ankle of an occupant in the event of a frontal collision (in particular in the event that a small overlap collision or an oblique collision was happened at the seated occupant side).

The knee side face restraint airbag device of the second aspect has the excellent advantageous effect of being able to reduce or prevent twisting of the ankle of an occupant in the event of a frontal collision (in particular in the event that a small overlap collision or an oblique collision was happened at the seated occupant side).

The knee side face restraint airbag device of the third aspect has the excellent advantageous effects of rendering reinforcement measures to receive deployment reaction force of the knee side face restraint airbag unnecessary, and of enabling the knee side face restraint airbag to be quickly inflated and deployed between the knee side face and a vehicle cabin inside face of a vehicle side portion since the knee side face restraint airbag deploys with stable posture.

The knee side face restraint airbag device of the fourth aspect has the excellent advantageous effect of enabling the design of the door trim to be simplified.

The knee side face restraint airbag device of the fifth aspect has the excellent advantageous effect of enabling knee side face restraining performance to be improved.

The knee side face restraint airbag device of the sixth aspect has the excellent advantageous effects of enabling the knee side face of the seated occupant to be restrained in the event of a frontal collision (in particular in the event of a small overlap collision or an oblique collision) in a wider range of vehicle types, and of enabling greater commonality of components to be achieved.

The knee side face restraint airbag device of the seventh aspect has the excellent advantageous effect of enabling the design of the door trim to be simplified.

The knee side face restraint airbag device of the eighth aspect has the excellent advantageous effect of being able to reduce or prevent twisting of the ankle of an occupant in the event of a frontal collision (in particular in the event that a small overlap collision or an oblique collision was happened at the seated occupant side).

The knee side face restraint airbag device of the ninth aspect has the excellent advantageous effects of rendering reinforcement measures to receive deployment reaction force of the knee side face restraint airbag unnecessary, and of enabling the knee side face restraint airbag to be quickly inflated and deployed between the knee side face and a vehicle cabin inside face of a vehicle side portion since the knee side face restraint airbag deploys with stable posture.

The knee side face restraint airbag device of the tenth aspect has the excellent advantageous effect of allowing even more rapid inflation and deployment of the knee side face restraint airbag between the knee side face of the occupant and a vehicle width direction inside face of a vehicle side portion.

The knee side face restraint airbag device of the eleventh aspect has the excellent advantageous effect of enabling the output of the inflator to be reduced.

The knee side face restraint airbag device of the twelfth aspect has the excellent advantageous effect of enabling knee side face restraint performance to be enhanced.

The knee side face restraint airbag device of the thirteenth aspect has the excellent advantageous effect of being able to reduce or prevent twisting of the ankle of an occupant in the event of a frontal collision (in particular in the event that a small overlap collision or an oblique collision was happened at the seated occupant side).

The knee side face restraint airbag device of the fourteenth aspect has the excellent advantageous effects of rendering reinforcement measures to receive deployment reaction force of the knee side face restraint airbag unnecessary, and of enabling the knee side face restraint airbag to be quickly inflated and deployed between the knee side face and a vehicle cabin inside face of a vehicle side portion since the knee side face restraint airbag deploys with stable posture.

The knee side face restraint airbag device of the fifteenth aspect has the excellent advantageous effect of being able to restrain the outer lateral-side of the knee of the seated occupant at an early stage in the event of a frontal collision such as a small overlap collision or an oblique collision.

BRIEF DESCRIPTION OF THE DRAWINGS

Exemplary embodiments of the present invention will be described in detail based on the following figures, wherein:

FIG. 16 is a plan view schematically illustrating the concept of an area to be covered by a knee side face restraint airbag of the third exemplary embodiment; and FIG. 17 is a plan view illustrating a state in which a barrier has collided with a front bumper from an oblique direction in the third exemplary embodiment.

DETAILED DESCRIPTION

First Exemplary Embodiment

A knee side face restraint airbag device of a first exemplary embodiment of the present invention is described below with reference to FIG. 1 to FIG. 5. Note that in each of the drawings the vehicle front side is indicated by an arrow FR and the vehicle upper side is indicated by an arrow UP as appropriate. The vehicle width direction inside is indicated by an arrow IN. The vehicle illustrated in these drawings is a left-hand drive vehicle.

Figure 5:
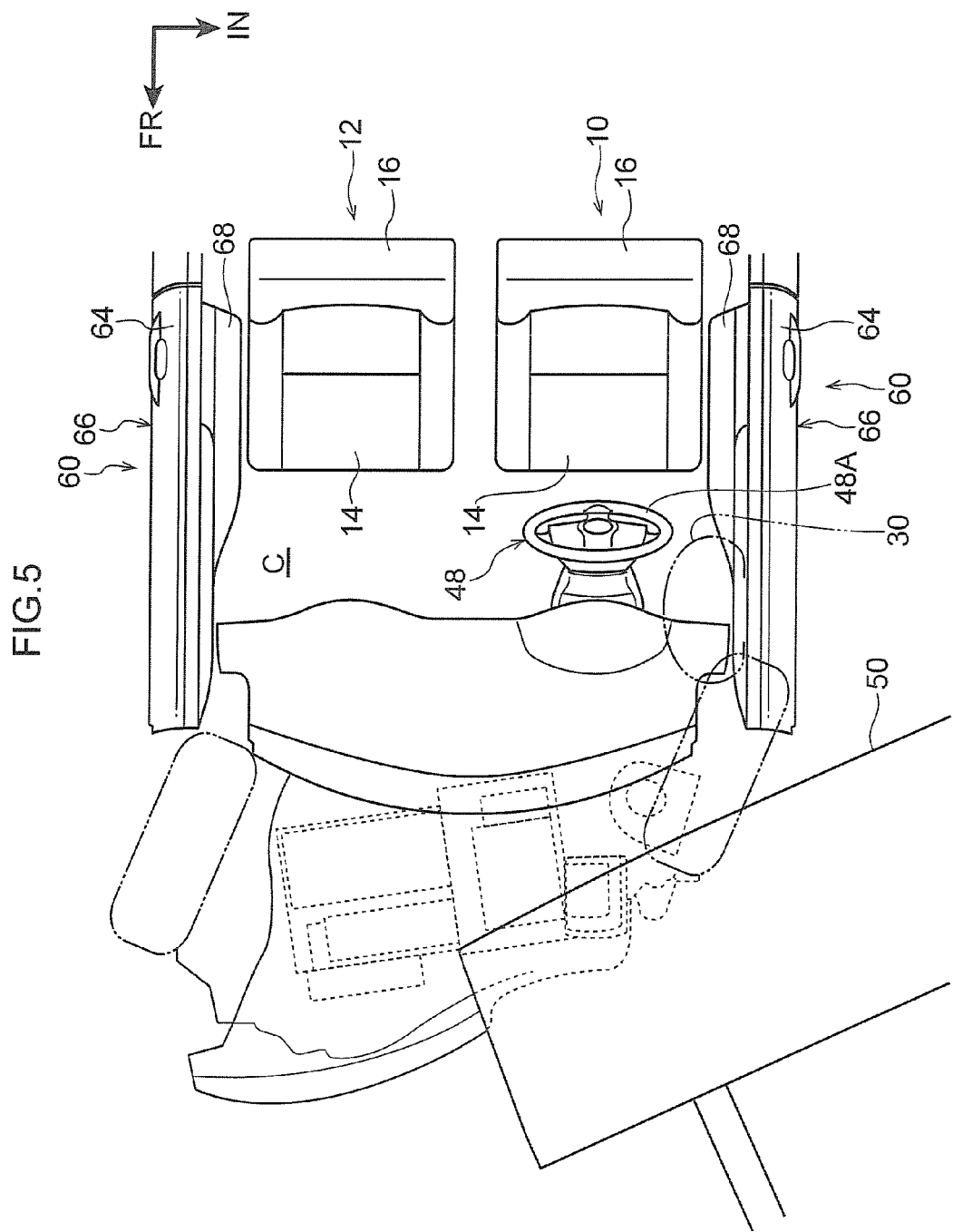
FIG. 5 is a plan view illustrating a state in which a barrier has collided with a front bumper from an oblique direction in the first exemplary embodiment.

As illustrated in FIG. 5, a driver's seat 10 and a passenger's seat 12 are disposed alongside one another in the vehicle width direction in a cabin C. The driver's seat 10 includes: a seat cushion 14 upon which an occupant sits; a seatback 16 that is reclinably supported at a rear end portion of the seat cushion 14 and that supports the back of the seated occupant; and a headrest 18 (see FIG. 3) that is disposed at an upper end portion of the seatback 16 so as to be moving up and down, and that supports the head of the seated occupant. Since the passenger's seat 12 is configured similarly to the driver's seat 10, the same reference numerals are used as for configuration elements of the driver's seat 10, and explanation thereof is omitted.

Figure 1:
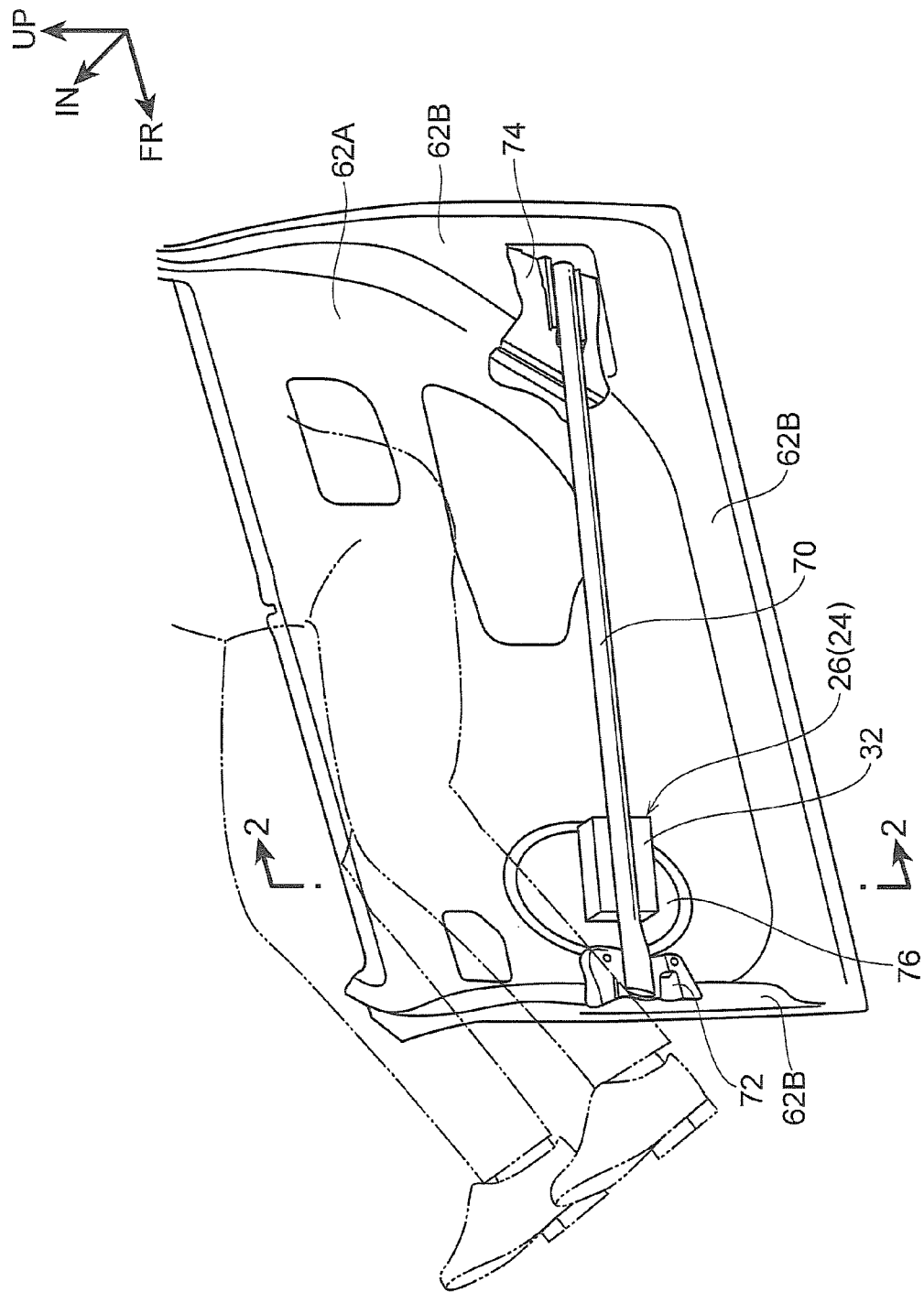
FIG. 1 is a perspective view illustrating an inside of a side door installed with a knee side face restraint airbag device of a first exemplary embodiment, as viewed from a vehicle cabin outside.
Figure 2:
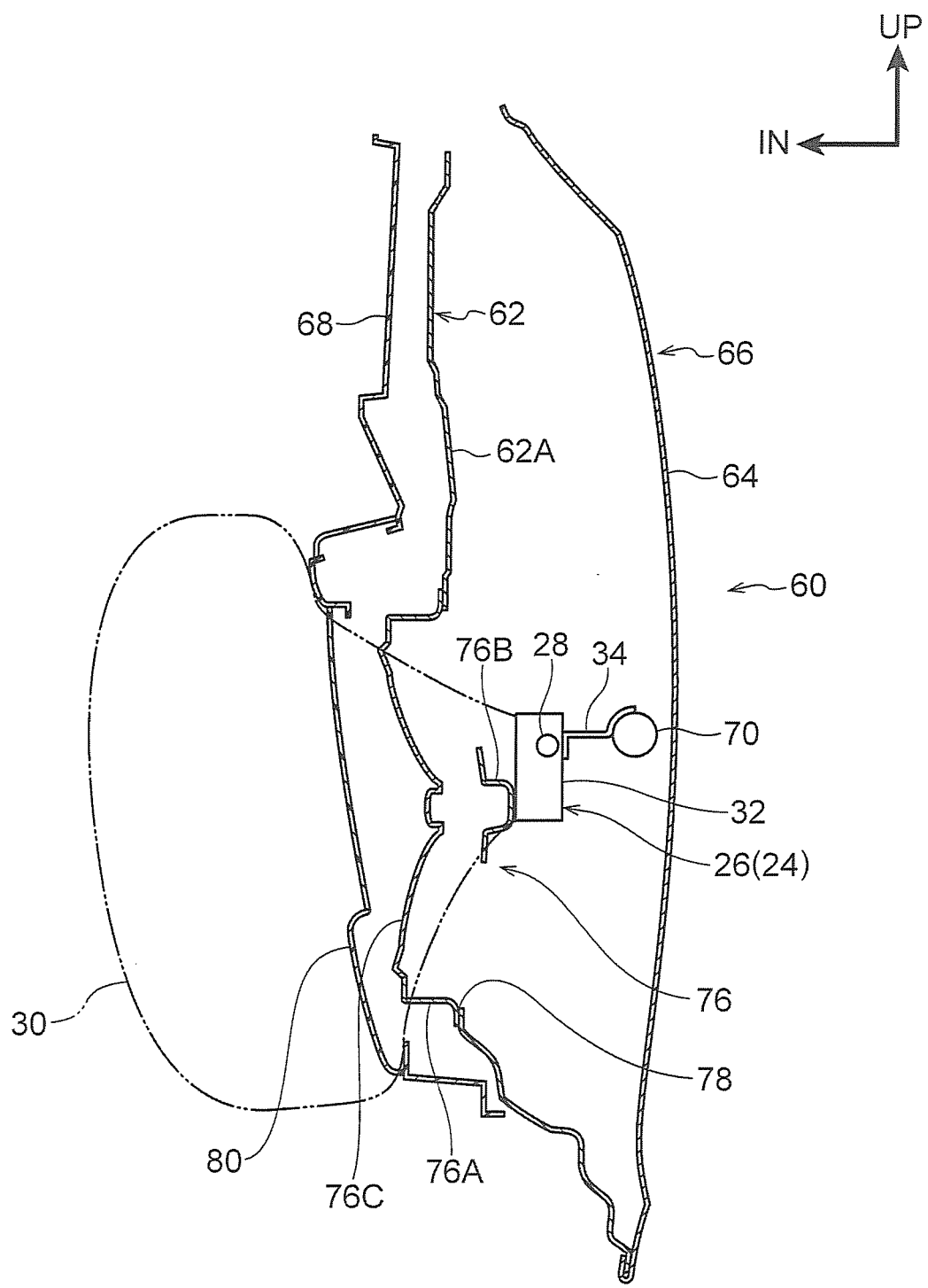
FIG. 2 is an enlarged vertical cross-section taken along line 2-2 in FIG. 1 to illustrate positional relationships in the knee side face restraint airbag device illustrated in FIG. 1.
Figure 4:
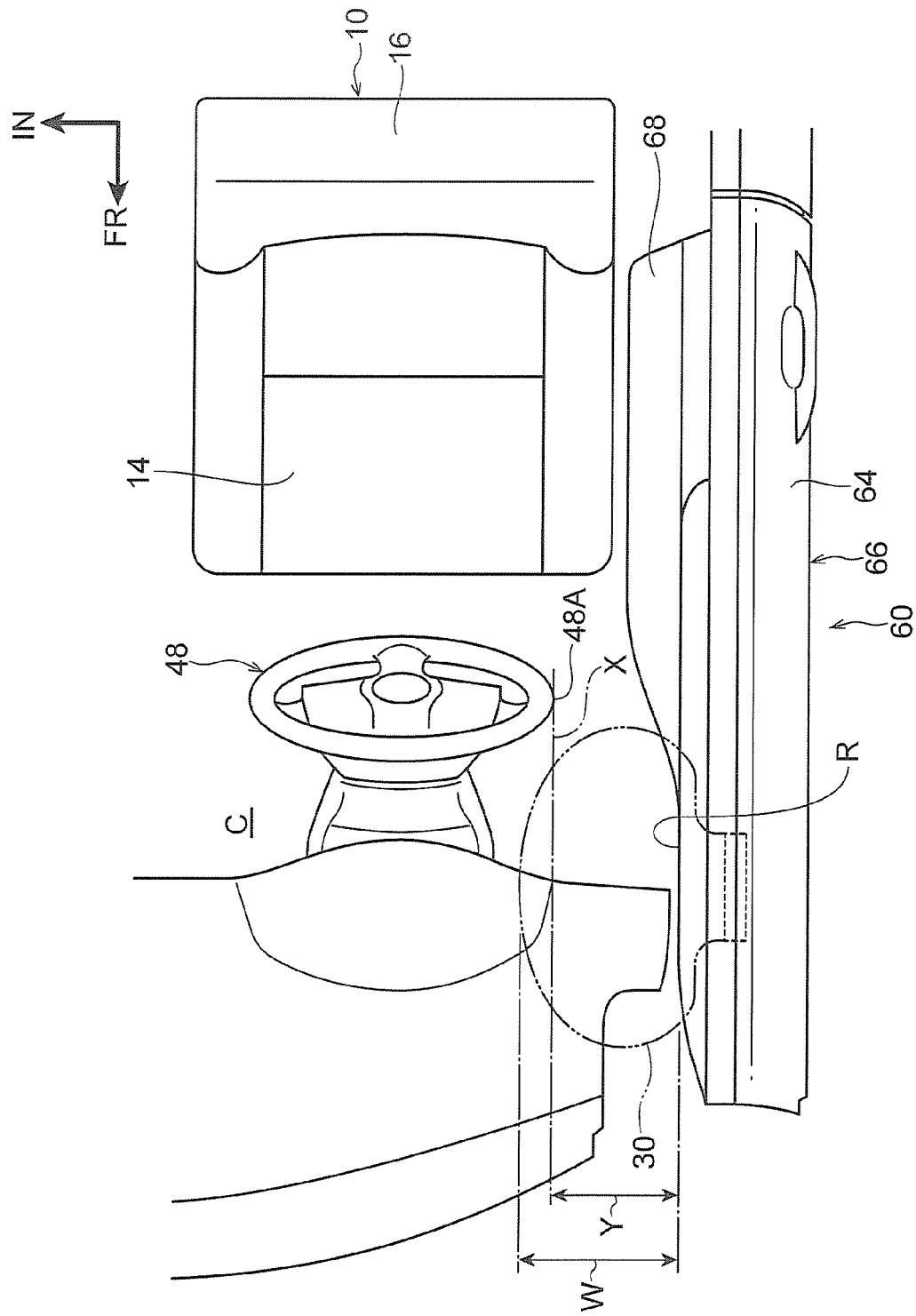
FIG. 4 is a plan view schematically illustrating the concept of an area to be covered by the knee side face restraint airbag illustrated in FIG. 1.

Front side doors 60 are respectively provided at the vehicle width direction outsides of the driver's seat 10 and the passenger's seat 12. As illustrated in FIG. 1, FIG. 2 and FIG. 4, the front side doors 60 are each configured including: a door main body portion 66 configured by a door inner panel 62 configuring a door inner plate and disposed at the vehicle width direction inside and a door outer panel 64 configuring a door outer plate and disposed at the vehicle width direction outside of the door inner panel 62; and a door trim 68 that is formed from resin, that is attached at the vehicle width direction inside of the door inner panel 62, and that configures a design face.

The door inner panel 62 is made from a steel plate, and a central portion thereof is formed integrally with a bulging portion 62A that houses components including a window regulator and a door lock device. The door inner panel 62 is moreover integrally formed with shelf portions 62B at both sides in the vehicle front-rear direction and at the vehicle lower side of the bulging portion 62A. The door outer panel 64 is also made from a steel plate, and a peripheral edge portion thereof is joined by hemming processing to the shelf portions 62B of the door inner panel 62 except for at an upper edge portion. Accordingly, the door outer panel 64 and the door inner panel 62 are integrated together to configure the door main body portion 66 in a pocket shape that is open at the upper edge portion.

A pipe shaped impact beam 70 is disposed inside the door main body portion 66 with length direction extending substantially in the vehicle front-rear direction. Attachment brackets 72, 74 are respectively welded to a front end portion and a rear end portion of the impact beam 70. The attachment brackets 72, 74 are respectively fixed to a vehicle front side and a vehicle rear side of the shelf portion 62B by for example bolt fastening. The rigidity of the door main body portion 66 of the front side door 60 with respect to load in the vehicle front-rear direction is accordingly increased.

A speaker 76 is provided to the bulging portion 62A of the door inner panel 62 at a position overlapping with the impact beam 70 and at the vehicle front side in side view of the vehicle. As illustrated in FIG. 2, the speaker 76 is configured including: a frame 76A; a main body portion 76B that is disposed at a central portion of the frame 76A and that is configured by for example a voice coil and a magnet; and a cone shaped oscillation plate 76C that is provided inside the frame 76A and that oscillates due to front-rear movement of the voice coil. The frame 76A is fixed to the periphery of an opening 78 that is formed in the door inner panel 62, thereby attaching the speaker 76 to the door inner panel 62. A speaker grille portion 80 is moreover provided in the door trim 68 at a position facing the speaker 76 along the vehicle width direction.

An airbag module 26 of the knee side face restraint airbag device 24 is disposed inside the door main body portion 66 of the front side door 60 and between the impact beam 70 and the speaker 76. The airbag module 26 is configured including: an inflator 28 with a circular column shape or a disc shape that actuate and generates gas in the event of a frontal collision (in particular in the event of a small overlap collision, or in the event of an oblique collision, explained below); a knee side face restraint airbag 30 that is installed in a folded state and that is inflated and deployed by the gas generated by the inflator 28; and a module case 32 that houses the inflator 28 and the knee side face restraint airbag 30.

FIG. 2 includes a simplified depiction of the inflator 28, however one end portion in an axial direction of the inflator 28 is provided with a gas ejection portion of smaller diameter than the one end portion of the inflator 28 and in a state projecting out coaxially to the one end portion. Plural gas ejection holes are formed at an outer peripheral portion of the gas ejection portion such that gas generated by the inflator 28 is ejected through these gas ejection holes. A squib (ignition device), not illustrated in the drawings, is disposed at another end portion in the axial direction of the inflator 28 and is configured such that a specific electrical current is supplied thereto when an airbag ECU, not illustrated in the drawings, that is disposed for example below a central console has made determination for actuation of the knee side face restraint airbag device. Components including an ignition agent, flammable agent, gas generating agent, coolant, and filter are housed in an interior portion of the inflator 28 such that on ignition of the ignition agent, the gas generating agent combusts through the flammable agent to generate a large quantity of high temperature gas. Configuration is made such that the generated high temperature gas is ejected via the gas ejection holes after it has been cooled by the coolant and debris has been removed by the filter. Note that a pressurized gas type inflator in which high pressure gas is sealed may be used in place of the inflator 28 described above.

Note that a diffuser that regulates the flow of gas generated by the inflator 28 may be provided integrally to the inflator 28, if necessary. The thus configured inflator 28, or the diffuser that is integrated together with the inflator 28, are inserted inside the knee side face restraint airbag 30 that is in a folded state. The inflator 28 and the knee side face restraint airbag 30 are then housed inside the module case 32 that is made from metal or resin and is for example covered with a protective fabric. A stud bolt projecting upright from the inflator 28 or the diffuser penetrates a bottom portion of the module case 32 and is fastened and fixed to a module attachment bracket 34 that is welded to the impact beam 70.

In the present exemplary embodiment, the airbag module 26 of the knee side face restraint airbag device 24 is accordingly disposed between the impact beam 70 and the speaker 76 inside the door main body portion 66 of the front side door 60. The speaker grille portion 80 is attached to the outer peripheral portion of the opening 78 of the door trim 68 using for example a removable fastener such as a clip. Note that the speaker grille portion may also be integrally formed to the door trim.

Figure 3:
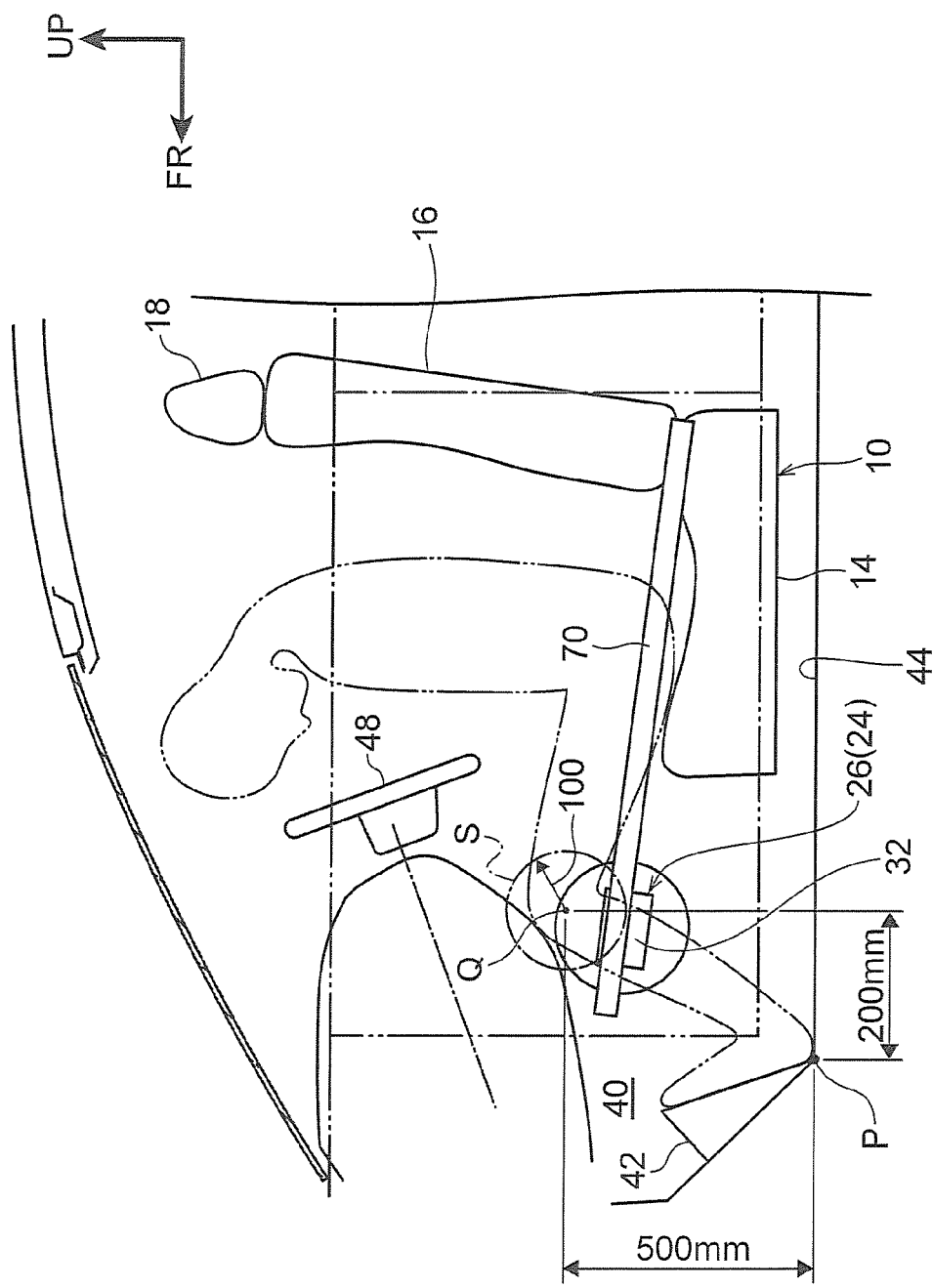
FIG. 3 is a side face view schematically illustrating the concept of an area to be covered by the knee side face restraint airbag illustrated in FIG. 1.

As illustrated in FIG. 3, the size of the knee side face restraint airbag 30 is set so as to include an area S in side view of the vehicle. More specifically, a footrest 42 is provided in a foot space 40 below an instrument panel. In side view of the vehicle, the knee side face restraint airbag 30 is formed so as to cover at least the area S, that has a radius of 100 mm and is centered around a position Q located 200 mm further towards the vehicle rear and 500 mm further towards the vehicle top than an intersection P between the footrest 42 and a floor panel 44. Note that the area S is determined so as to be appropriate for as many scenarios as possible in consideration of the fact that there are differences in for example vehicle configurations, knee displacement amounts accompanying movement of a seated occupant under inertia, and physical frames of occupants. In cases in which the vehicle configuration, the knee displacement amount and/or an anticipated physical frame of an occupant are specified, the area S may accordingly be modified so as to include the most appropriate area for the specified vehicle configuration, knee displacement amount and/or anticipated physical frame of the occupant. Note that the covered area may be set with a radius larger than 100 mm (for example a radius of 150 mm) whereby a wider range is covered so as to accommodate differences in vehicle configuration, or differences in the physical frames of occupants and the commonality of components can be realized.

As illustrated in FIG. 4, a thickness W in the vehicle width direction of the knee side face restraint airbag 30 when inflated and deployed is set so as to be a distance from a door trim design face R to an outer lateral-side of the knee of the seated occupant or greater. Note that as seen in plan view, the position of the "outer lateral-side of the knee of the seated occupant" can be considered as substantially corresponding to a line X that contacts a vehicle width direction outside peripheral edge 48A of a steering wheel 48 and that runs along the vehicle front-rear direction. In other words, the thickness W of the knee side face restraint airbag 30 is set so as to be a distance Y from the door trim design face R to the line X or greater.

Operation and Advantageous Effects of the Present Exemplary Embodiment

Operation and advantageous effects of the present exemplary embodiment are described below.

Other than in the event of a frontal collision, for example during normal vehicle travel, the knee side face restraint airbag device 24 is not actuated. From this state, in the event of a frontal collision, in particular in the event of a small overlap collision in which an offset collision occurs further to the vehicle width direction outside than a front side member, or in the event of an oblique collision in which a barrier 50 collides diagonally with a front bumper as illustrated in FIG. 5, this state is detected by an airbag sensor and output to the airbag ECU. The airbag ECU determines whether or not the knee side face restraint airbag device 24 should be actuated, and when it has been determined that the knee side face restraint airbag device 24 should be actuated, a specific amount of electrical current is passed through the squib of the inflator 28. The inflator 28 is thereby actuated and a large amount of gas is generated. The generated gas flows into the knee side face restraint airbag 30 that is housed in a folded state inside the module case 32, inflating the knee side face restraint airbag 30. As a result, the knee side face restraint airbag 30 obtains a reaction force from the impact beam 70 and inflates and deploys towards the vehicle cabin inside. More specifically, the knee side face restraint airbag 30 passes through the opening 78 formed in the door inner panel 62 and enters the inside of the frame 76A of the speaker 76. The speaker grille portion 80 provided to the door trim 68 is then removed from the door trim 68 or destroyed, and the knee side face restraint airbag 30 inflates and deploys towards the vehicle cabin inside. Note that when this occurs, the tube shaped frame 76A functions as a restricting means that restricts the knee side face restraint airbag 30 deployment direction. The knee side face restraint airbag 30 is interposed between the knee side face of the seated occupant and the door trim design face R as described above.

Normally, in the event that a small overlap collision or a collision from an oblique direction (an oblique collision) has happened at a seated occupant side, the knee of the seated occupant would move sideways towards the vehicle width direction outside where the collision occurred. However, in the present exemplary embodiment, the outer lateral-side of the knee of the seated occupant is restrained by the knee side face restraint airbag 30 that inflates and deploys towards the vehicle cabin inside from the speaker 76 of the front side door 60 as described above. As a result, twisting of the ankle of the occupant can be reduced or prevented in the event of a frontal collision (particularly in the event of a small overlap collision or an oblique collision) according to the present exemplary embodiment. Note that quickly restraining the outer lateral-side of the knee of the seated occupant obtains the advantageous effect of enabling the behavior of the occupant to be controlled in a stable manner regardless of differences in the physical frame or seating posture of the occupant.

As well as the advantageous effect described above, attempting to restrain the knee side face of the occupant using supports (pads) such as those of the prior art described before entails the disadvantage of reducing the space available to the occupant since it is necessary to set the pads over a wide range in consideration of variations in collisions. Moreover, pads cannot be set at locations where functional components provided within a door trim are present, making it difficult to restrain the knee side face in a manner that is both effective and practical. However, since the knee side face restraint airbag device 24 of the present exemplary embodiment is housed in the space between the door inner panel 62 and the door outer panel 64 of the front side door 60, when not actuated, such disadvantages do not arise.

In the present exemplary embodiment, the impact beam 70 is disposed between the door outer panel 64 and door inner panel 62 of the front side door 60, and the airbag module 26 is attached to the impact beam 70 through the module attachment bracket 34. The impact beam 70 can therefore support a reaction force during inflation and deployment of the knee side face restraint airbag 30. As a result, reinforcement measures to receive a deployment reaction force of the knee side face restraint airbag 30 is rendered unnecessary, the knee side face restraint airbag 30 deploys with stable posture, and therefore, the knee side face restraint airbag 30 can be rapidly inflated and deployed between the knee side face and a vehicle cabin inside face (door trim R) of a vehicle side portion. More specifically, the knee side face restraint airbag 30 inflates and deploys towards the vehicle cabin inside from the speaker grille portion 80 and restrains the knee side face of the occupant, however when this occurs, the knee side face restraint airbag 30 resiliently deforms the door trim 68 towards a door inner panel 62 side so as to contact the door inner panel 62. A reaction force that restrains the knee side face can thereby also be obtained from the door inner panel 62.

Moreover, in the present exemplary embodiment, the speaker 76 is disposed in the front side door 60, and the knee side face restraint airbag 30 breaks the oscillation plate 76C, either removes or destroys the speaker grille portion 80, and inflates and deploys towards the vehicle cabin inside. There is therefore no need to provide a dedicated airbag door, enabling the design of the door trim 68 to be simplified. Even supposing a splitting-open portion were to be set at the speaker grille portion 80 of door trim 68 and the speaker grille portion configured so as to open up in the manner of an airbag door, the splitting-open portion could be made unobtrusive, enabling good design characteristics of the door trim to be maintained.

Moreover, in the present exemplary embodiment, the thickness W in the vehicle width direction of the knee side face restraint airbag 30 when inflated and deployed is set so as to be the distance Y from the door trim design face R to the outer lateral-side of the knee of the seated occupant or greater. The knee side face restraint airbag 30 accordingly has sufficient thickness to receive the knee side face of the seated occupant. A reaction force that restrains the outer lateral-side of the knee of the seated occupant can accordingly be obtained at an early stage in the event of a frontal collision such as a small overlap collision or an oblique collision. As a result, the present exemplary embodiment enables an improvement in knee side face restraining performance.

In the present exemplary embodiment, on inflation and deployment, the knee side face restraint airbag 30 covers at least an area up to and including a radius of 100 mm centered on the position Q located 200 mm further towards the vehicle rear and 500 mm further towards the vehicle top than the intersection P between the footrest 42 provided in a foot space 40 and the floor panel 44. The knee side face of a seated occupant can accordingly be restrained even in vehicles of various vehicle concepts. As a result, in the present exemplary embodiment, the knee side face of the seated occupant can be restrained in the event of a frontal collision (in particular in the event of a small overlap collision or an oblique collision) in a wider range of vehicle types, and greater commonality of components can be achieved.

Second Exemplary Embodiment

Explanation follows regarding a knee side face restraint airbag of a second exemplary embodiment of the present invention, with reference to FIG. 6 to FIG. 12. Note that in each of the drawings an arrow FR indicates the vehicle front side and an arrow UP indicates the vehicle upper side where appropriate. An arrow IN indicates the vehicle width direction inside. Note that the vehicle illustrated in these drawings is a left-hand drive vehicle.

Figure 6:
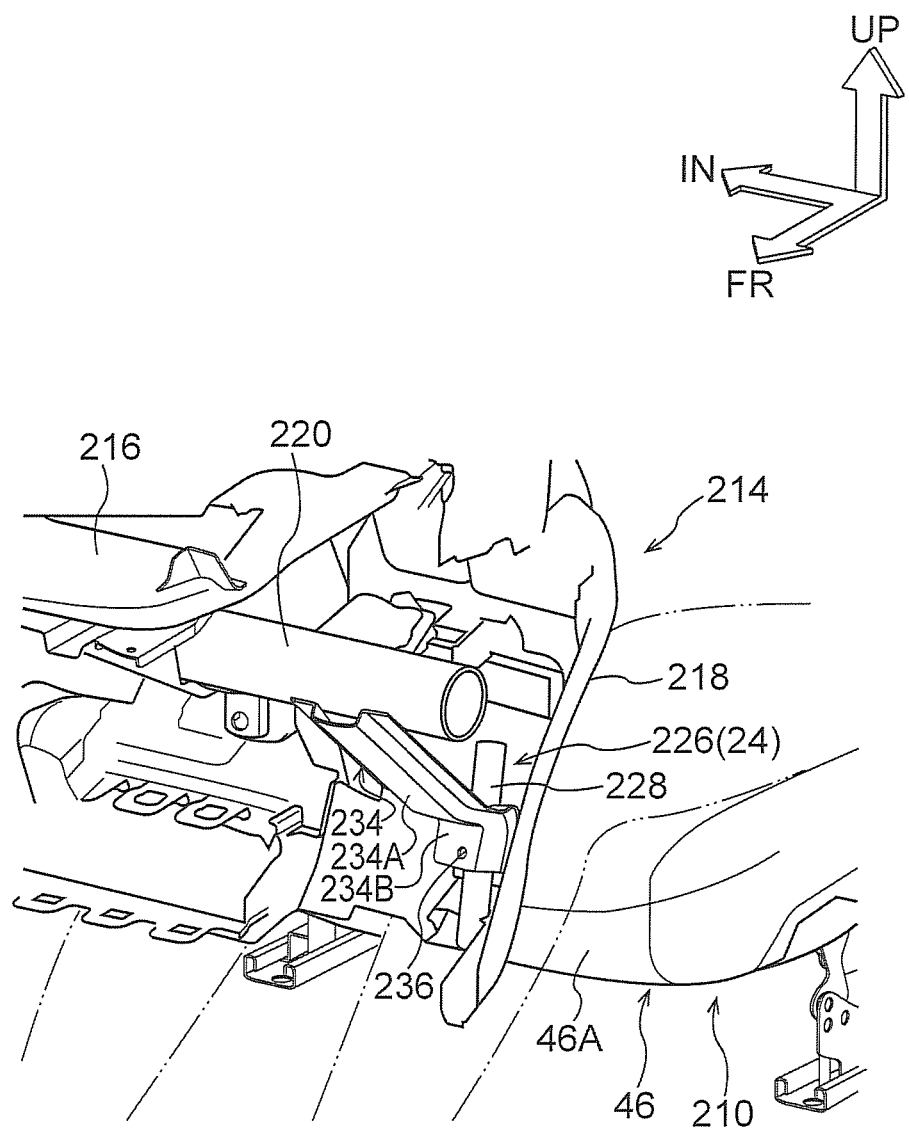
FIG. 6 is a perspective view illustrating a knee side face restraint airbag device of a second exemplary embodiment as viewed from a back side face of an instrument panel (viewed from a vehicle front side)
Figure 7:
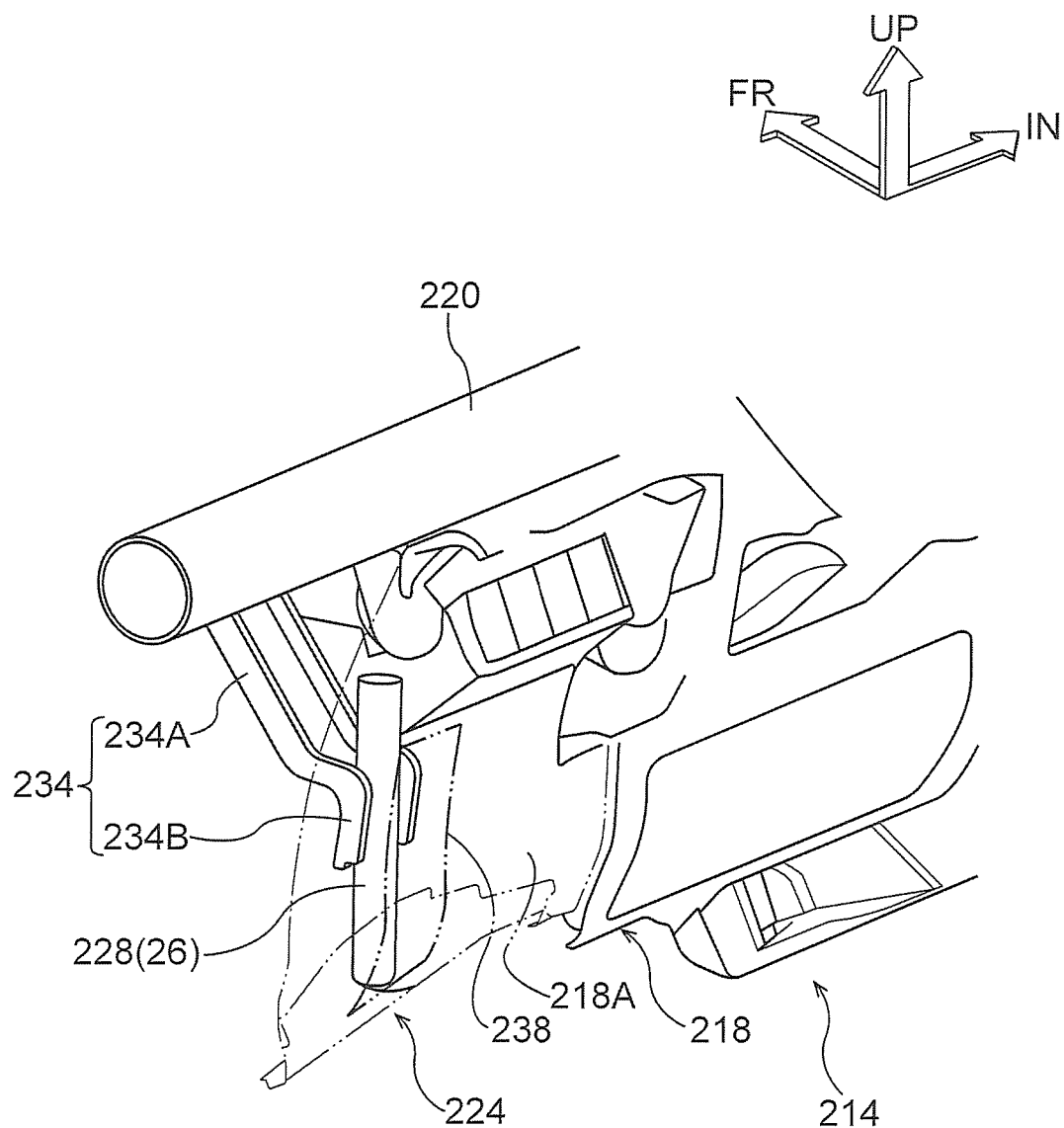
FIG. 7 is an enlarged perspective view of a knee side face restraint airbag device of the second exemplary embodiment as viewed from a vehicle cabin inside.
Figure 12:
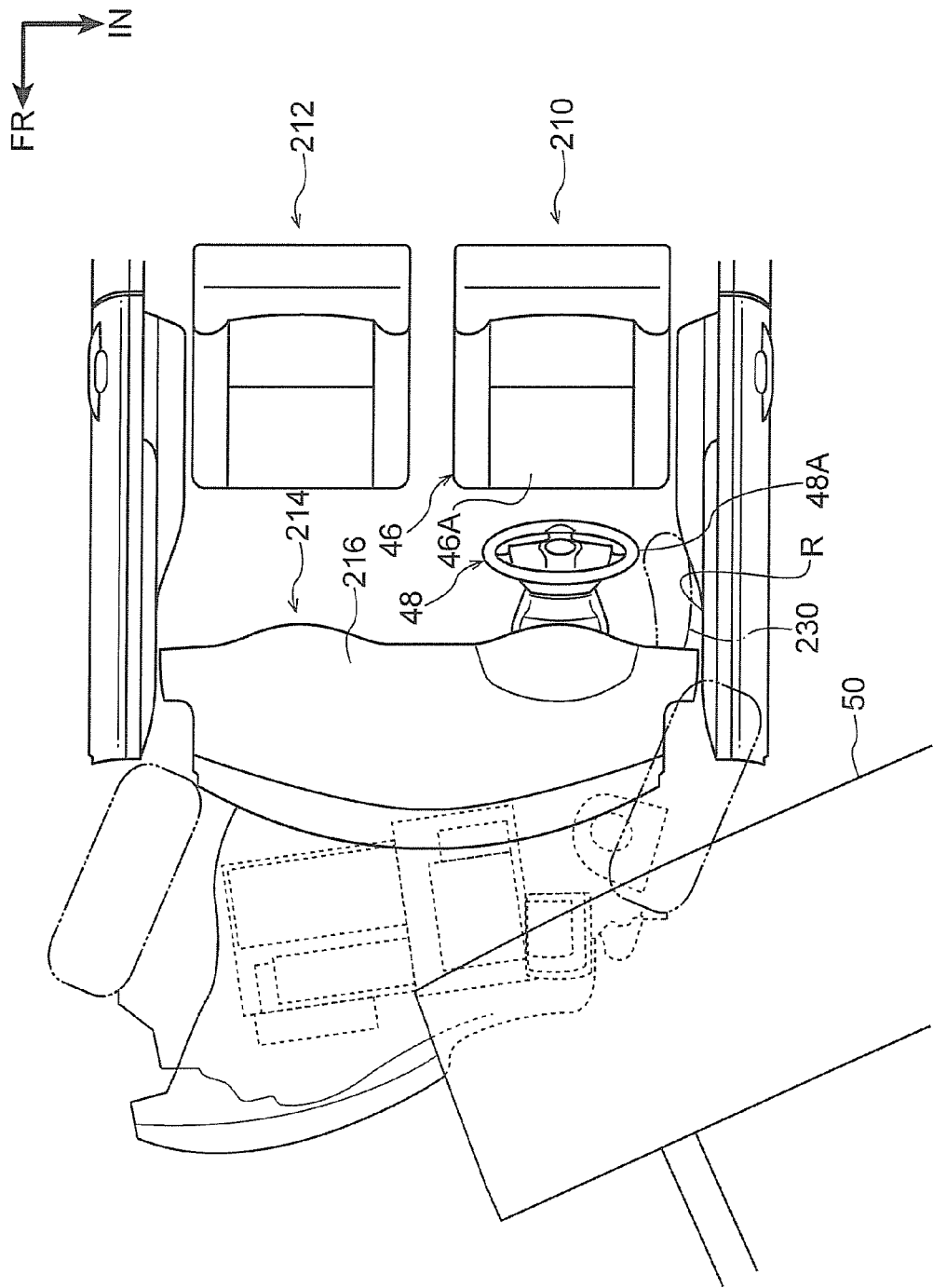
FIG. 12 is a plan view illustrating a state in which a barrier has collided with a front bumper from an oblique direction in the second exemplary embodiment.

As illustrated in FIG. 6 to FIG. 8, a resin instrument panel 214 is disposed to the vehicle front side of a driver's seat 210 and a passenger's seat 212 (see FIG. 12). The instrument panel 214 is configured by: an instrument panel upper member 216 that configures an upper portion; and an instrument panel lower member 218 that is disposed at the vehicle lower side of the instrument panel upper member 216 and integrated together with the instrument panel upper member 216 by means of engagement claws. Instrument panel reinforcement 220 that is made of metal and is pipe shaped is disposed at the inside of the instrument panel 214 so as to extend along the vehicle width direction. The instrument panel reinforcement 220 is a high strength and high rigidity member. Attachment brackets 222 with three arms that respectively extend towards the radial direction outside are affixed by for example welding to length direction end portions of the instrument panel reinforcement 220. Left and right attachment brackets 222 of the instrument panel reinforcement 220 are each bolt fastened to a front pillar inner member, not illustrated in the drawings, such that the instrument panel reinforcement 220 extends spanning between the left and right front pillars.

An airbag module 226 of a knee side face restraint airbag device 224 is disposed at an outside in the vehicle width direction within the instrument panel 214. The airbag module 226 is configured including: a circular column shaped inflator 228 that actuates to generate gas in the event of a frontal collision (in particular in the event of a small overlap collision or an oblique collision); a knee side face restraint airbag 230 (see FIG. 8A) that is disposed in a folded state and inflates and deploys due to the gas generated by the inflator 228; and a module case, not illustrated in the drawings, that houses the inflator 228 and the knee side face restraint airbag 230.

The inflator 228 is configured similarly to the inflator 28 of the first exemplary embodiment and so explanation thereof is omitted. Note that a pressurized gas type inflator in which high pressure gas is sealed may be used in place of the inflator 228.

Note that a diffuser that regulates the flow of generated gas from the inflator 228 may be integrally provided to the inflator 228 if required. The thus configured inflator 228, and/or the diffuser that is integrated to the inflator 228, are inserted into the knee side face restraint airbag 230 that is in a folded state. The inflator 228 and the knee side face restraint airbag 230 described above are housed inside the module case, not illustrated in the drawings, that is made of metal or resin and for example covered in a protective fabric. The knee side face restraint airbag 230 is configured such that a stud bolt projecting upright from the inflator 228 and/or the diffuser penetrates a bottom portion of the module case and is fastened and fixed to a module attachment bracket 234. Note that the module case is formed in a box shape that is open at the vehicle rear side.

As illustrated in FIG. 6 and FIG. 7, the metal module attachment bracket 234 is fixed at the vicinity of an outside end portion in the vehicle width direction of the instrument panel reinforcement 220. The module attachment bracket 234 is configured as an elongated channel shaped member. The module attachment bracket 234 is moreover formed with a hat shaped vertical cross section profile, and is configured by a slide shaped extension portion 234A that extends at an incline, and a module fixing portion 234B that is bent from a vehicle rear side end portion of the extension portion 234A so as to hang down towards the vehicle lower side. An upper end portion of the extension portion 234A is fixed by for example welding to a lower portion of an outer peripheral of the instrument panel reinforcement 220. One or plural bolt insertion holes 236 are formed to the module fixing portion 234B. Stud bolts that project out from the inflator 228 or from the diffuser are inserted into the bolt insertion holes 236 and nuts, not illustrated in the drawings, are screwed thereon. The airbag module 226 is thereby fastened and fixed to the module fixing portion 234B of the module attachment bracket 234.

Figure 9:
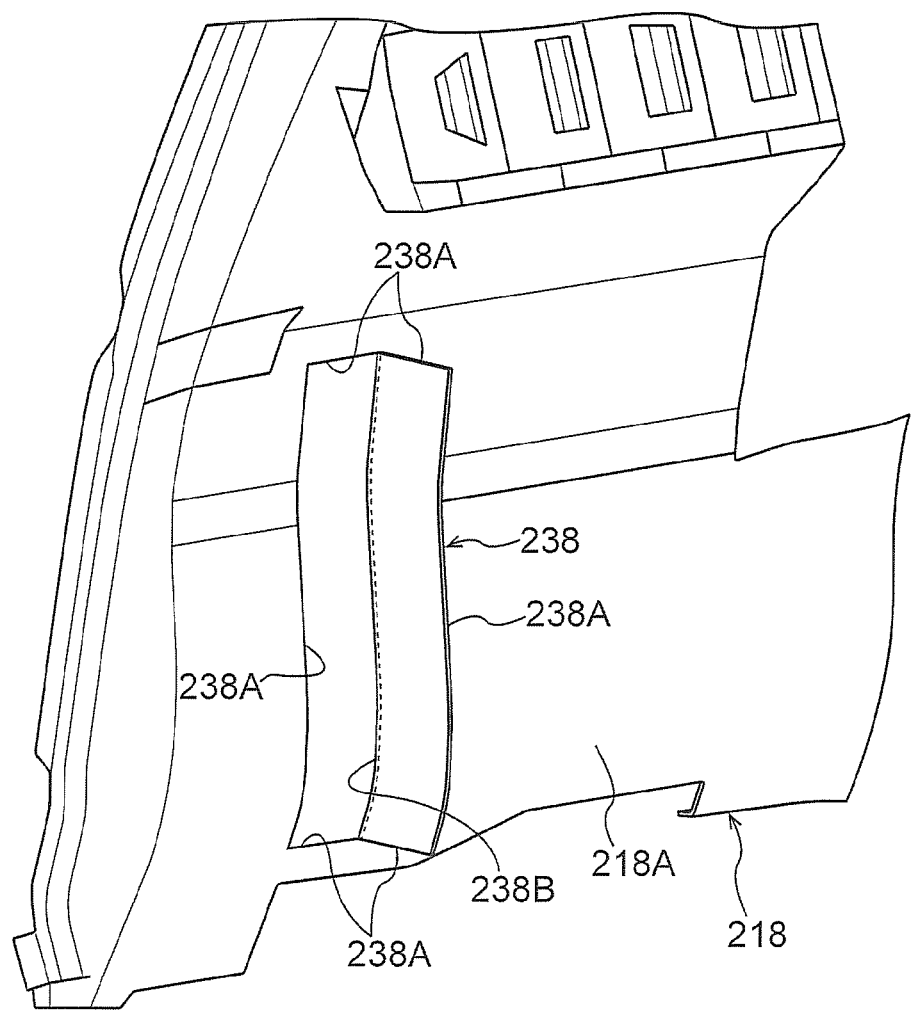
FIG. 9 is an enlarged perspective view illustrating an opened up state of an airbag door provided to an instrument panel lower member in a knee side face restraint airbag device of the second exemplary embodiment.

An airbag door 238 that closes off the opening portion of the module is provided at an outside location in the vehicle width direction of the instrument panel lower member 218 of the instrument panel 214. As illustrated in FIG. 9, the airbag door 238 is formed with a long narrow rectangle shape as viewed from a back face side of the instrument panel lower member 218. A tear portion 238A that splits upon receipt of a bag inflation pressure of a specific value or greater is formed at three sides of a back face side of the airbag door 238, namely at an upper side portion, a lower side portion and a long side portion positioned at outside in the vehicle width direction out of a pair of a left and a right long side portion. Note that the tear portion 238A is formed for example by forming a notch as a V-shaped groove in a base material side of the instrument panel 214, or by forming several slits in the base material at a specific pitch by end milling. Moreover, out of the left and right pair of long side portions of the airbag door 238, a back face side of the long side portion that is positioned at inside in the vehicle width direction is integrally formed with a hinge portion 238B that is formed with a V-shaped or U-shaped cross-section profile so as to give surplus length. The airbag door 238 thus normally exists as an invisible portion that does not appear on the design face 218A of the instrument panel lower member 218, however in the event of a frontal collision, the airbag door 238 splits along the tear portion 238A, and opens up towards the vehicle width direction inside about the hinge portion 238B.

Figure 8A:
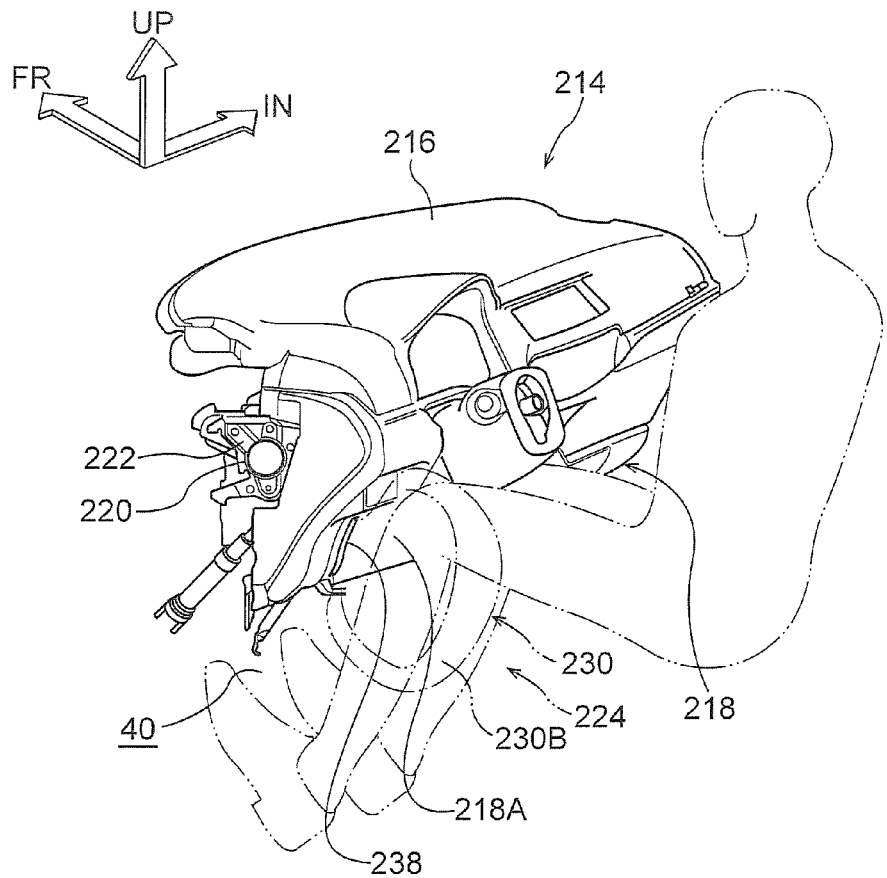
FIG. 8A to FIG. 8C illustrate a knee side face restraint airbag device of the second exemplary embodiment, with FIG. 8A being a perspective view illustrating an actuated state, FIG. 8B being a side face view illustrating in an inflated and deployed state of a knee side face restraint airbag that is in a vehicle installed state, and FIG. 8C being a plan view illustrating the knee side face restraint airbag.
Figure 8B:
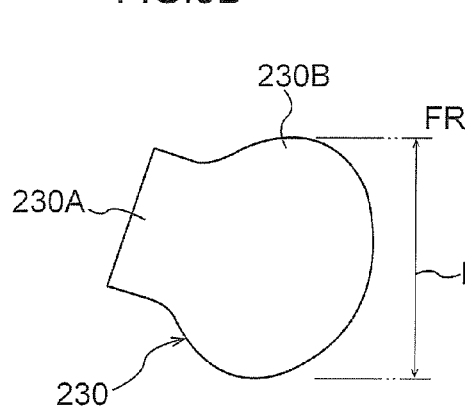
Figure 8C:
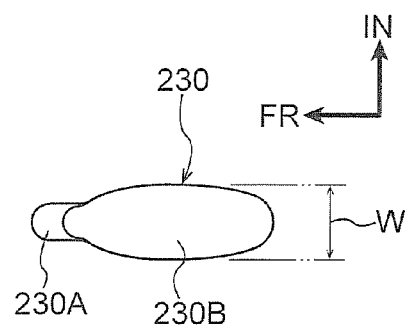

As illustrated in FIG. 8B and FIG. 8C, the knee side face restraint airbag 230 is provided with: a base portion 230A that is disposed inside the instrument panel 214 even when the inflator 228 is actuated and the knee side face restraint airbag 230 is inflated and deployed; and a main body portion 230B that is formed integrally to the base portion 230A and is inflated and deployed to outside (vehicle cabin inside) of the instrument panel 214 upon being inflated and deployed. Moreover, in a vehicle installed state, a length H in the vehicle up-down direction (see FIG. 8B) of the main body portion 230B of the knee side face restraint airbag 230 is set so as to be twice a thickness W in the vehicle width direction or greater (see FIG. 8C) when the knee side face restraint airbag 230 is inflated and deployed.

Figure 10:
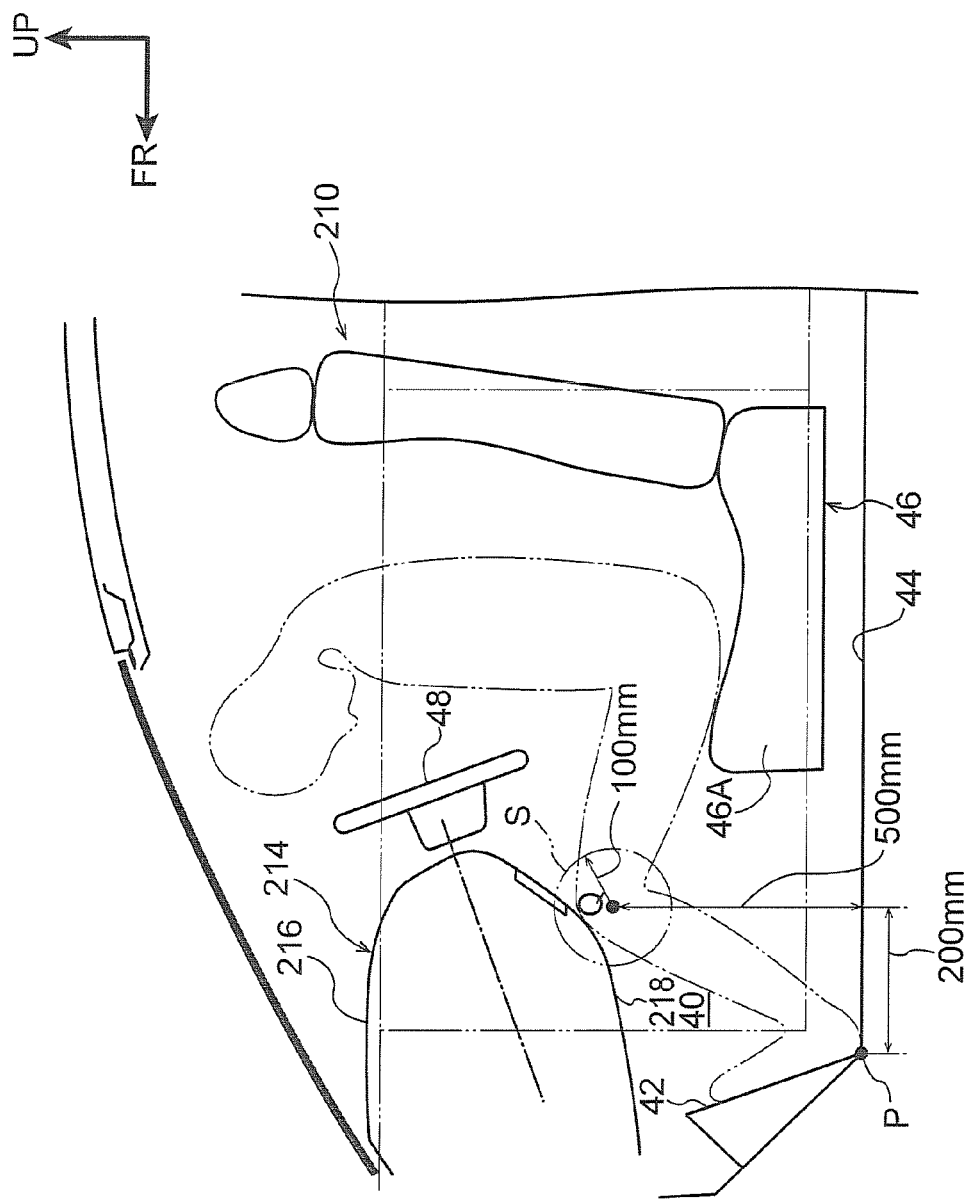
FIG. 10 is a side face view schematically illustrating the concept of an area to be covered by a knee side face restraint airbag of the second exemplary embodiment.

Similarly to in the first exemplary embodiment, the size of the knee side face restraint airbag 230 in side view of the vehicle is set so as to include the area S, as illustrated in FIG. 10. Namely, in side view of the vehicle, the knee side face restraint airbag 230 is formed so as to cover at least the area S, that has a radius of 100 mm centered on the position Q located 200 mm further towards the vehicle rear and 500 mm further towards the vehicle top than the intersection P between the footrest 42 and the floor panel 44. Note that the area S is determined so as to be appropriate for as many collision scenarios as possible in consideration of the fact that there are differences in for example vehicle configurations, knee displacement amounts accompanying movement of a seated occupant under inertia, and physical frames of occupants. In cases in which the vehicle configuration, the knee displacement amount and/or an anticipated physical frame of an occupant are specified, the area S may accordingly be modified so as to include the most appropriate area for the specified vehicle configuration, knee displacement amount and/or anticipated physical frame of the occupant.

Figure 11:
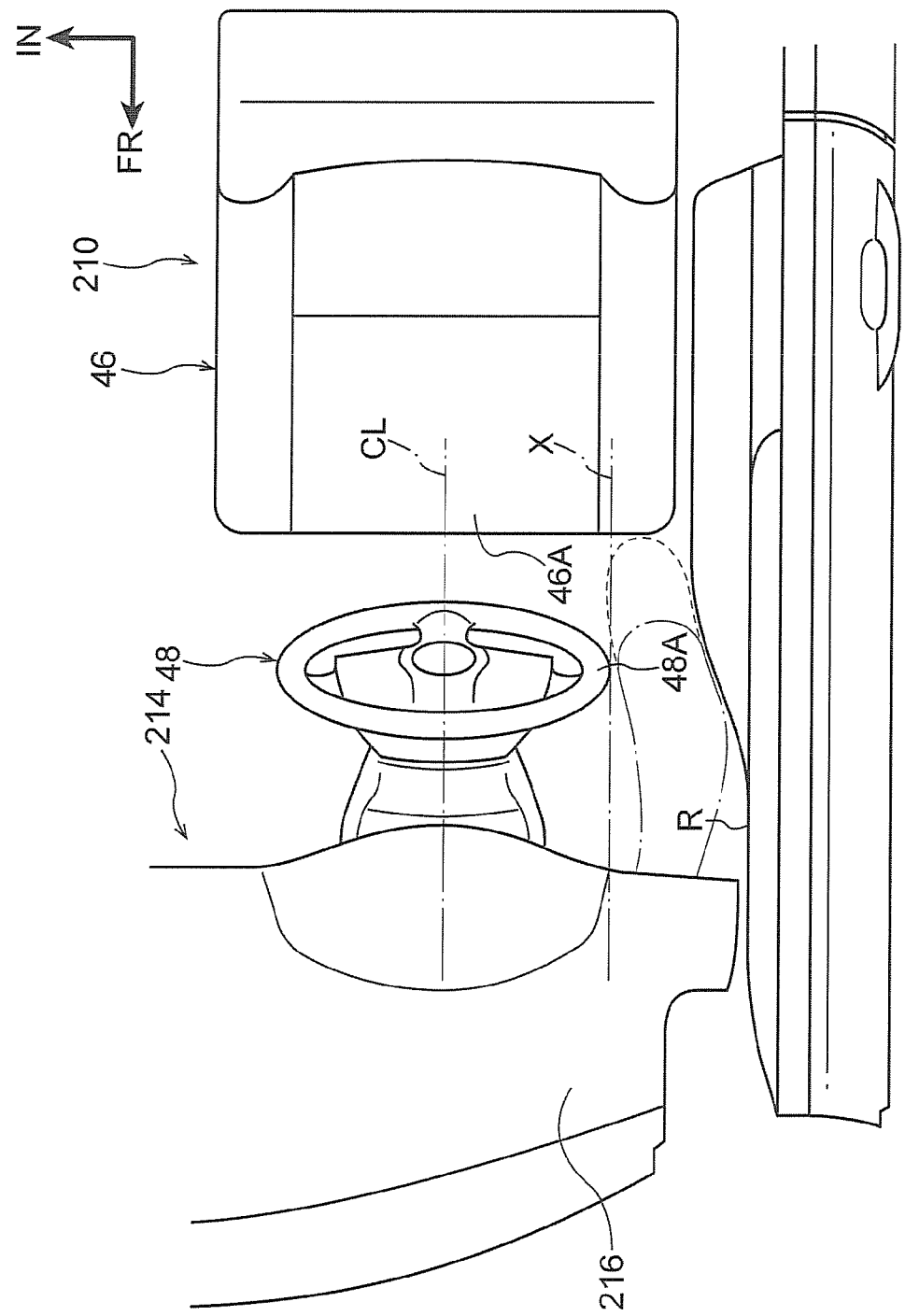
FIG. 11 is a plan view schematically illustrating the concept of an area to be covered by a knee side face restraint airbag of the second exemplary embodiment.

As illustrated with a two-dotted chain line in FIG. 11, the knee side face restraint airbag 230 is configured so as to inflate and deploy between a steering center line CL and the door trim design face R. In reality, the knee side face restraint airbag 230 is inflated and deployed between a position offset to the vehicle width direction outside of the steering center line CL that is, for example, a line X running along the vehicle front-rear direction so as to contact an outside peripheral edge 48A in the vehicle width direction of the steering wheel 48 and the door trim design face R. Configuration is made such that in the inflated and deployed state of the knee side face restraint airbag 230, a vehicle rear side end portion of the main body portion 230B of the knee side face restraint airbag 230 does not contact a front end portion 46A of a seat cushion 46 of the vehicle seat 210.

Operation and Advantageous Effects of the Present Exemplary Embodiment

Explanation follows regarding operation and advantageous effects of the present exemplary embodiment.

Other than in the event of a frontal collision, for example during normal vehicle travel, the knee side face restraint airbag device 224 is not actuated. In the event of a frontal collision, in particular in the event of a small overlap collision in which an offset collision occurs further to the vehicle width direction outside than the front side member, or in the event of an oblique collision in which the barrier 50 collides diagonally with the front bumper as illustrated in FIG. 12, this state is detected by the airbag sensor and output to the airbag ECU. The airbag ECU determines whether or not the knee side face restraint airbag device 224 should be actuated, and when it has been determined that the knee side face restraint airbag device 224 should be actuated, a specific amount of electrical current is passed through the squib of the inflator 228. The inflator 228 is thereby actuated and a large amount of gas is generated. The generated gas flows into the knee side face restraint airbag 230 that is housed in a folded state inside the module case, inflating the knee side face restraint airbag 230. Bag inflation pressure acts on the back face of the airbag door 238 as a result. The tear portion 238A splits when this bag inflation pressure reaches the specific value, and the airbag door 238 is opened up towards the vehicle width direction inside about the hinge portion 238B. The knee side face restraint airbag 230 is inflated and deployed from the design face 218A of the instrument panel lower member 218 of the instrument panel 214 towards the vehicle rear and the diagonal lower side such that the knee side face restraint airbag 230 is present between the knee side face of the seated occupant and the door trim design face R.

Normally, in the event that a small overlap collision or a collision from an oblique direction (an oblique collision) has happened at a seated occupant side, the knee of the seated occupant would move sideways towards the vehicle width direction outside where the collision occurred. However, in the present exemplary embodiment, an outer lateral-side of the knee of the seated occupant is restrained by the knee side face restraint airbag 230 that inflates and deploys from the design face 218A of the instrument panel lower member 218 towards the vehicle rear and the diagonal lower side. As a result, twisting of the ankle of the occupant can be reduced or prevented in the event of a frontal collision (particularly in the event of a small overlap collision or an oblique collision) according to the present exemplary embodiment. Note that quickly restraining the outer lateral-side of the knee of the seated occupant obtains the advantageous effect of enabling the behavior of the occupant to be controlled in a stable manner regardless of differences in the physical frame or seating posture of the occupant.

In addition to the above advantageous effects, as described in the first exemplary embodiment, in comparison to when the knee side face of an occupant is restrained using supports (pads) such as those of the prior art described before, the knee side face restraint airbag device 224 of the present exemplary embodiment has the advantage of being housed in a space at the vehicle width direction outside within the instrument panel 214 when not actuated.

In the present exemplary embodiment, the instrument panel reinforcement 220 is provided extending along the vehicle width direction inside the instrument panel 214, and the airbag module 226 is supported by the instrument panel reinforcement 220 through the module attachment bracket 234. Reaction force can therefore be adequately supported during inflation and deployment of the knee side face restraint airbag 230. Reinforcement measures to receive the deployment reaction force of the knee side face restraint airbag 230 are therefore rendered unnecessary, enabling greater degrees of freedom for design and a reduction in costs to be achieved. Moreover, the knee side face restraint airbag 230 deploys with stable posture, enabling the knee side face restraint airbag 230 to be quickly inflated and deployed between the knee side face and a vehicle cabin inside face (door trim design face R) at the vehicle side portion.

Moreover in the present exemplary embodiment, in the vehicle installed state, a length H in the vehicle up-down direction of the main body portion 230B of the knee side face restraint airbag 230 is set so as to be twice a thickness W in the vehicle width direction or greater when the knee side face restraint airbag 230 is inflated and deployed, thus enabling a knee side face restraint airbag to be made with thin design. As a result, the present exemplary embodiment enables even more rapid inflation and deployment of the knee side face restraint airbag 230 between the knee side face of the occupant and the vehicle width direction inside face (door trim design face R) of the vehicle side portion.

Moreover in the present exemplary embodiment, the length in the vehicle front-rear direction of the knee side face restraint airbag 230 can be made shorter due to configuring the knee side face restraint airbag 230 so as not to contact the front end portion 46A of the seat cushion 46 of the vehicle seat 210 when inflated and deployed. The knee side face restraint airbag 230 is accordingly reduced in size, reducing the gas capacity. As a result, the output of the inflator 228 can be reduced according to the present exemplary embodiment.

Moreover in the present exemplary embodiment, the knee side face restraint airbag 230 inflates and deploys between the steering center line CL and the door trim design face R. On inflation and deployment, the knee side face restraint airbag 230 covers at least an area up to and including a radius of 100 mm centered on the position Q located 200 mm further towards the vehicle rear and 500 mm further towards the vehicle top than the intersection P between the footrest 42 provided in the foot space 40 and the floor panel 44. The knee side face of a seated occupant can accordingly be restrained even in vehicles of various vehicle concepts. As a result, in the present exemplary embodiment, the knee side face of the seated occupant can be restrained in the event of a frontal collision (in particular in the event of a small overlap collision or an oblique collision) in a wider range of vehicle types, and greater commonality of components can be achieved.

Supplementary Explanation of the Second Exemplary Embodiment

In the present exemplary embodiment described above, in the vehicle installed state, the length H in the vehicle up-down direction of the main body portion 230B of the knee side face restraint airbag 230 when inflated and deployed is set so as to be twice thickness W in the vehicle width direction or greater, however the invention is not limited thereto. It is appreciated that the knee side face restraint airbags are optionally configured such that the height H is set at less than twice the thickness W.

In the present exemplary embodiment described above, the knee side face restraint airbag 230 is configured so as not to contact the front end portion 46A of the seat cushion 46 of the vehicle seat 210 when inflated and deployed, however the invention is not limited thereto. The dimension of the knee side face restraint airbag along the vehicle front-rear direction when inflated and deployed may be increased such that the knee side face restraint airbag contacts the front end portion of the seat cushion of the vehicle seat when inflated and deployed (as illustrated with a dotted line in FIG. 11). In such a configuration, when the knee side face restraint airbag is inflated and deployed, a front end portion of the knee side face restraint airbag contacts the front end portion of the seat cushion, thereby enabling the knee side face restraint airbag to obtain a reaction force from the front end portion of the seat cushion. The knee side face restraint airbag thus functions as a wall. Knee side face restraining performance can be improved as a result.

Third Exemplary Embodiment

A knee side face restraint airbag device of a third exemplary embodiment of the present invention is described below with reference to FIG. 13 to FIG. 17. Note that an arrow FR indicates the vehicle front side and an arrow UP indicates the vehicle upper side in each of the drawings as appropriate. An arrow IN indicates the vehicle width direction inside. The vehicle illustrated in the drawings is a left-hand drive vehicle.

As illustrated in FIG. 17, outsides of a driver's seat 310 and a passenger's seat 312 are configured similarly to those in the first exemplary embodiment.

Figure 13:
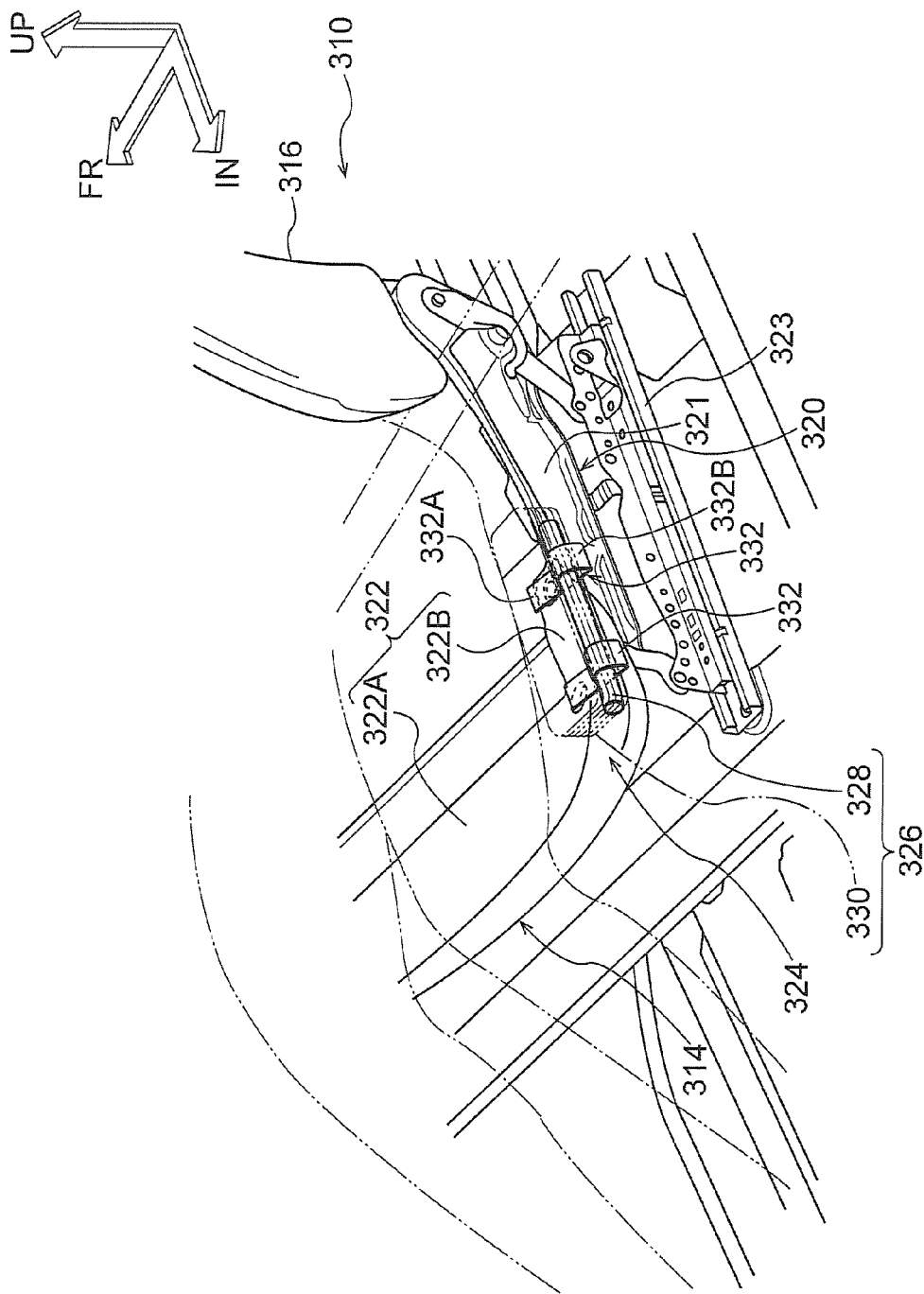
FIG. 13 is a perspective view illustrating a seat cushion installed with a knee side face restraint airbag device of a third exemplary embodiment, as viewed from a diagonal upper side of the vehicle.
Figure 14:
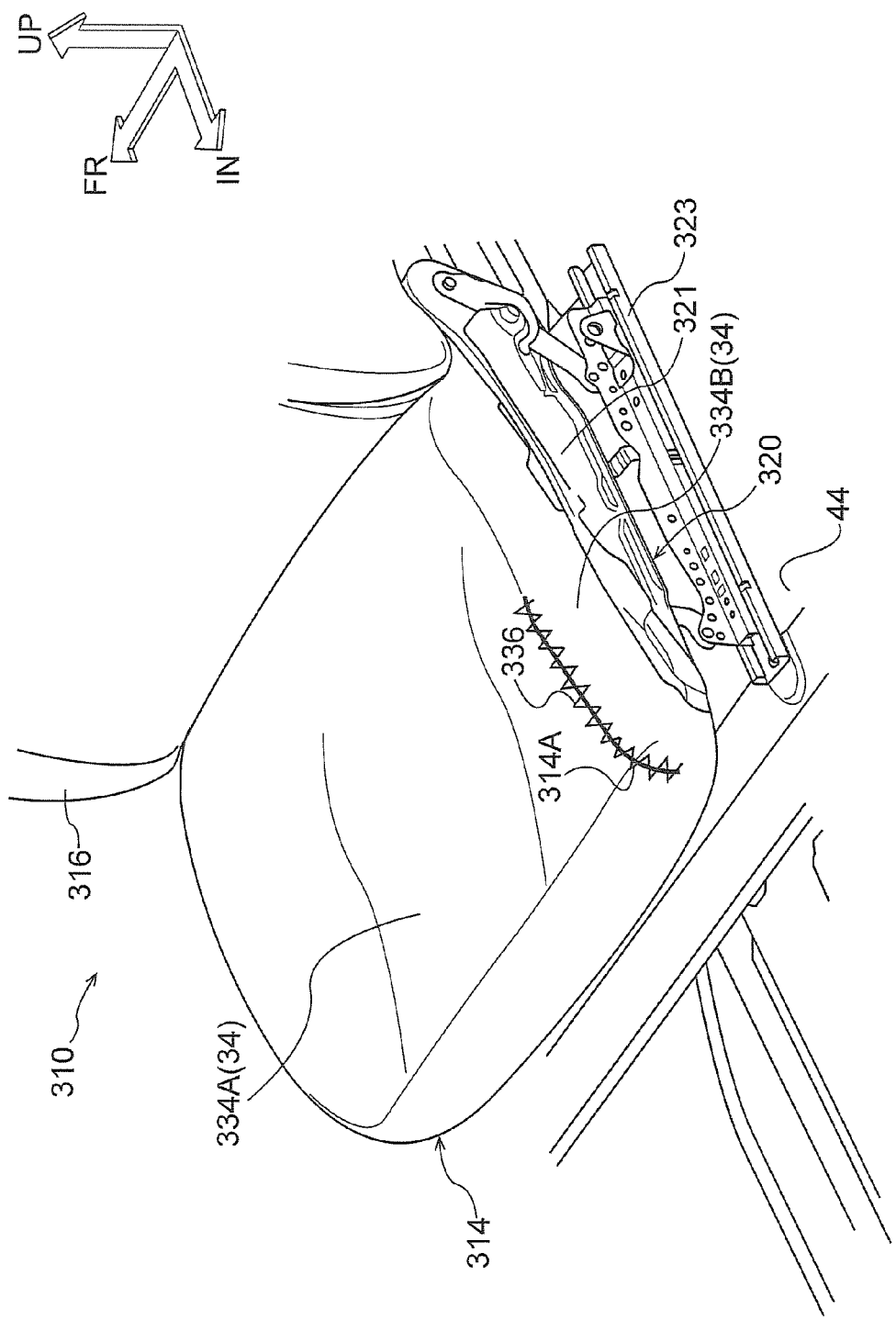
FIG. 14 is a perspective view illustrating the seat cushion illustrated in FIG. 13 in a state prior to actuation of a knee side face restraint airbag device.

As illustrated in FIG. 13 and FIG. 14, a seat cushion 314 is provided with a seat cushion frame 320 that is assembled into a rectangular frame shape in plan view. The seat cushion frame 320 is configured by: a pair of left and right seat side frames 321 that are respectively disposed with length direction along the vehicle front-rear direction and are separated each other in a vehicle width direction; a seat front pan 322 that couples together respective front end portions of the seat side frames 321 in the vehicle width direction; and a connecting rod, not illustrated in the drawings, that couples together respective rear end portions of the seat side frames 321 in the vehicle width direction. The seat side frames 321 are supported so as to be slidable by a pair of left and right seat slide rails 323 that are fixed to a floor panel 44. The seat front pan 322 includes an upper face support portion 322A that supports the thigh of a seated occupant, and an extension portion 322B that extends out towards the vehicle rear side from both end portions in the vehicle width direction of the upper face support portion 322A.

An airbag module 326 of a knee side face restraint airbag device 324 is disposed at a location outside in the vehicle width direction of the seat cushion frame 320. The airbag module 326 is configured including: a circular column shaped inflator 328 that actuates to generate gas in the event of a frontal collision (in particular in the event of a small overlap collision or an oblique collision); a knee side face restraint airbag 330 (see FIG. 15) that is disposed in a folded state and inflates and deploys due to the gas generated by the inflator 328; and a module case, not illustrated in the drawings, that houses the inflator 328 and the knee side face restraint airbag 330.

A simplified depiction of the inflator 328 is illustrated in for example FIG. 13, however the inflator 328 is configured similarly to the inflator 28 of the first exemplary embodiment. Note that a pressurized gas type inflator in which high pressure gas is sealed may be used in place of the inflator 328.

Note that a diffuser that regulates the flow of gas generated by the inflator 328 may be provided integrally to the inflator 328 if necessary. The thus configured inflator 328, or the diffuser that is integrated together with the inflator 328, are inserted inside the knee side face restraint airbag 330 that is in a folded state. The inflator 328 and the knee side face restraint airbag 330 are then housed inside the module case, not illustrated in the drawings, that is made from metal or resin and is for example covered with a protective fabric. Stud bolts projecting upright from the inflator 328 or the diffuser penetrate a bottom portion of the module case and is fastened and fixed to a pair of front and rear module attachment brackets 332. Note that the module case is not strictly necessary.

The module attachment brackets 332 are made from metal and are respectively configured by: a narrow plate shaped base portion 332A that is disposed with length direction extending in the vehicle width direction; and a retaining portion 332B that is joined to the base portion 332A and is folded back from a vehicle width direction outside end portion of the base portion 332A in a semicircular shape. In a retained state of the inflator 328 of the airbag module 326 between retaining portion 332B and the base portion 332A, inside end portions in the vehicle width direction of the base portions 332A are respectively fixed to the upper face support portion 322A and the extension portion 322B of the seat front pan 322 by a fixing technique such as welding. In an assembled state, the inflator 328 is therefore disposed in a state jutting out from the seat side frame 321 towards the vehicle width direction outside, with the knee side face restraint airbag device 324 in a disposed state on the upper face support portion 322A and the extension portion 322B of the seat front pan 322.

As illustrated in FIG. 14, a cover 334 that covers the seat cushion pad, not illustrated in the drawings, of the seat cushion 314 is configured including: an upper face portion 334A on which the seated occupant sits; and a side face portion 334B that is disposed at the vehicle width direction outside of the upper face portion 334A. An outside terminal portion in the vehicle width direction of the upper face portion 334A and an inside terminal portion in the vehicle width direction of the side face portion 334B are sewn together along the vehicle front-rear direction at a boundary location between the upper face portion 334A and the side face portion 334B. In the present exemplary embodiment, of this vehicle front-rear direction sewn location, a sewn location within a range from a front side to a front end portion is sewn with a tear seam that splits when applied with a pulling load of a specific value or greater. The range that is sewn with the tear seam is referred to below as the "sewn portion 336". In other words, the sewn portion 336 is set so as to exceed an upper side front end corner portion 314A of the seat cushion 314 when running from the seatback 316 side.

Figure 15:
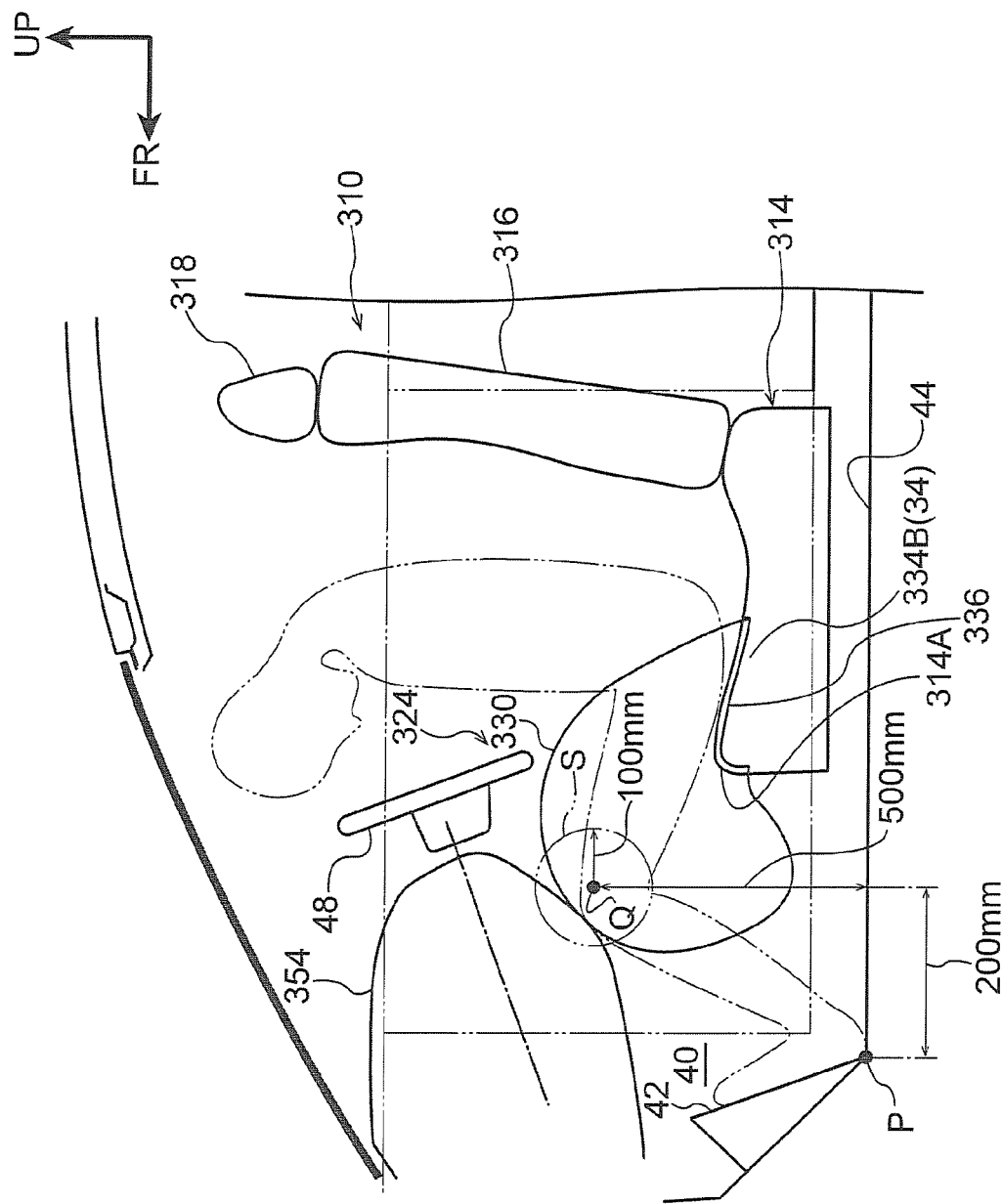
FIG. 15 is a side face view schematically illustrating the concept of an area to be covered by a knee side face restraint airbag of the third exemplary embodiment.

As illustrated in FIG. 15, the size of the knee side face restraint airbag 330 is set so as to include the area S in side view of the vehicle, similarly to as in the first exemplary embodiment. Namely, in side view of the vehicle the knee side face restraint airbag 330 is formed so as to cover at least the area S, that has a radius of 100 mm centered on the position Q located 200 mm further towards the vehicle rear and 500 mm further towards the vehicle top than the intersection P between the footrest 42 and the floor panel 44. Note that the area S is determined so as to be appropriate for as many collision scenarios as possible in consideration of the fact that there are differences in for example vehicle configurations, knee displacement amounts accompanying movement of a seated occupant under inertia, and physical frames of occupants. In cases in which the vehicle configuration, the knee displacement amount and/or an anticipated physical frame of an occupant are specified, the area S may accordingly be modified so as to include the most appropriate area for the specified vehicle configuration, knee displacement amount and/or anticipated physical frame of the occupant.

As illustrated in FIG. 16, a thickness W in the vehicle width direction of the knee side face restraint airbag 330 when inflated and deployed is set so as to be a distance from the door trim design face R to an outer lateral-side of the knee of the seated occupant or greater. Note that as seen in plan view, the position of the "outer lateral-side of the knee of the seated occupant" can be considered as substantially corresponding to a line X that contacts an outside peripheral edge 48A in the vehicle width direction of the steering wheel 48 and that runs along the vehicle front-rear direction. In other words, the thickness W of the knee side face restraint airbag 330 is set so as to be a distance Y from the door trim design face R to the line X or greater.

Operation and Advantageous Effects of the Present Exemplary Embodiment

Explanation follows regarding operation and advantageous effects of the present exemplary embodiment.

Other than in the event of a frontal collision, for example during normal vehicle travel, the knee side face restraint airbag device 324 is not actuated. In the event of a frontal collision, in particular in the event of a small overlap collision in which an offset collision occurs further to the vehicle width direction outside than the front side member, or in the event of an oblique collision in which a barrier 50 collides diagonally with the front bumper as illustrated in FIG. 17, this state is detected by the airbag sensor and output to the airbag ECU. The airbag ECU determines whether or not the knee side face restraint airbag device 324 should be actuated, and when it has been determined that the knee side face restraint airbag device 324 should be actuated, a specific amount of electrical current is passed through the squib of the inflator 328. The inflator 328 is thereby actuated and a large amount of gas is generated. The generated gas flows into the knee side face restraint airbag 330 that is housed in a folded state inside the module case 332, inflating the knee side face restraint airbag 330. As a result, bag inflation pressure acts on the sewn portion 336 of the cover 334 of the seat cushion 314, and when this bag inflation pressure reaches the specific value the sewn portion 336 splits, forming an opening portion 352 between the upper face portion 334A and the side face portion 334B of the cover 334 (see FIG. 16). The knee side face restraint airbag 330 inflates and deploys from the opening portion 352 towards the vehicle front side, and is therefore present between the knee side face of the seated occupant and the door trim design face R.

Normally, in the event that a small overlap collision or a collision from an oblique direction (an oblique collision) has happened at a seated occupant side, the knee of the seated occupant would move sideways towards the vehicle width direction outside where the collision occurred. However, in the present exemplary embodiment, an outer lateral-side of the knee of the seated occupant is restrained by the knee side face restraint airbag 330 that inflates and deploys from the outside front end side of the seat cushion 314 towards the vehicle front side as described above. As a result, twisting of the ankle of the occupant can be reduced or prevented in the event of a frontal collision (particularly in the event of a small overlap collision or an oblique collision) according to the present exemplary embodiment. Note that quickly restraining the outer lateral-side of the knee of the seated occupant obtains the advantageous effect of enabling the behavior of the occupant to be controlled in a stable manner regardless of differences in the physical frame or seating posture of the occupant.

In addition to the above advantageous effects, as described in the first exemplary embodiment, in comparison to when attempting to restrain the knee side face of an occupant using supports (pads) such as those of the prior art described before, the knee side face restraint airbag device 324 of the present exemplary embodiment has the advantage of being housed inside the seat cushion 314 when not actuated.

In the present exemplary embodiment, the vehicle seat 310 is provided with the seat cushion frame 320 that supports the seat cushion 314, and the airbag module 326 is attached to the seat cushion frame 320 through the module attachment brackets 332. Reaction force can therefore be adequately supported during inflation and deployment of the knee side face restraint airbag 330. Reinforcement measures to receive the deployment reaction force of the knee side face restraint airbag 330 are therefore rendered unnecessary in the present exemplary embodiment, and the knee side face restraint airbag 330 can be quickly inflated and deployed between the knee side face and a vehicle cabin inside face of the vehicle side portion since the knee side face restraint airbag 30 deploys with stable posture.

The present exemplary embodiment is moreover provided with the sewn portion 336 that is set at the boundary location between the upper face portion 334A and the side face portion 334B of the cover 334 of the seat cushion 314. The knee side face restraint airbag 330 inflates and deploys along the thigh of the seated occupant when the knee side face restraint airbag 330 splits open the sewn portion 336 and inflates and deploys towards the vehicle front side. The sewn portion 336 is moreover set to exceed the upper side front end corner portion 314A of the seat cushion 314 when running from the seatback 316 side. The knee side face restraint airbag 330 is thereby inflated and deployed so as to pass close to the shortest route from substantially the rear side of the knee side face of the seated occupant towards the vehicle front side, as illustrated in FIG. 15. As a result, in the present exemplary embodiment the knee side face restraint airbag 330 can restrain the outer lateral-side of the knee of the seated occupant at an early stage in the event of a frontal collision such as a small overlap collision or an oblique collision.

Moreover, in the present exemplary embodiment, a thickness W in the vehicle width direction of the knee side face restraint airbag 330 when inflated and deployed is set so as to be the distance Y from the door trim design face R to the outer lateral-side of the knee of the seated occupant (substantially corresponding to the line X running along the vehicle front-rear direction so as to contact the outside peripheral edge 48A in the vehicle width direction of the steering wheel 48) or greater. The knee side face restraint airbag 330 accordingly has sufficient thickness to bear the knee side face of the seated occupant. A reaction force that restrains the outer lateral-side of the knee of the seated occupant can accordingly be obtained at an early stage in the event of a frontal collision such as a small overlap collision or an oblique collision. As a result, the present exemplary embodiment enables an improvement in knee side face restraining performance.

In the present exemplary embodiment, on inflation and deployment the knee side face restraint airbag 330 covers at least an area up to and including a radius of 100 mm centered on the position Q located 200 mm further towards the vehicle rear and 500 mm further towards the vehicle top than the intersection P between the footrest 42 provided in the foot space 40 and the floor panel 44. The knee side face of a seated occupant can accordingly be restrained even in vehicles of various vehicle concepts. As a result, in the present exemplary embodiment, the knee side face of the seated occupant can be restrained in the event of a frontal collision (in particular in the event of a small overlap collision or an oblique collision) in a wider range of vehicle types, and greater commonality of components can be achieved.

Supplementary Explanation Regarding the First to Third Exemplary Embodiments

In the exemplary embodiments described above, explanation has been given regarding knee side face restraint airbag devices that are actuated in the event of a frontal collision, in particular in the event of a small overlap collision in which an offset collision occurs further to the vehicle width direction outside than a front side member, or in the event of an oblique collision in which a barrier collides diagonally with a front bumper as illustrated in FIG. 5, however there is no limitation thereto. The knee side face restraint airbag device may be configured so as to be actuated in the event of, or in the event of prediction of, all frontal collisions including full overlap collisions and offset collisions other than small overlap collisions.

Moreover, in the exemplary embodiments described above explanation is given regarding knee side face restraint airbag devices disposed in a driver's seat side front side door. However, a knee side face restraint airbag device may be similarly disposed in a passenger's seat side front side door.

What is claimed is:

1. A knee side face restraint airbag device comprising:
   an inflator that generates gas upon actuation; and
   a knee side face restraint airbag that is disposed in a folded state at an outside in a vehicle width direction at an inside of a vehicle interior member, that inflates and deploys towards a vehicle cabin inside upon being supplied with gas generated from the inflator, and that is adapted to restrain an outer lateral-side of a knee of a seated occupant,
   wherein the knee side face restraint airbag is disposed in a folded state at an outside in the vehicle width direction at an inside of an instrument panel, is inflated and deployed from a design face of the instrument panel towards a vehicle rear and a diagonal lower side upon being supplied with gas generated from the inflator,
   wherein, in a vehicle installed state, a length along a vehicle up-down direction of the knee side face restraint airbag when the knee side face restraint airbag is inflated and deployed is set to be twice a thickness along the vehicle width direction of the knee side face restraint airbag or greater, and
   the knee side face restraint airbag is adapted to be inflated and deployed between the outer lateral-side of the knee of the seated occupant and a door trim design face of a side door.

2. The knee side face restraint airbag device of claim 1, wherein:
   the knee side face restraint airbag is configured such that when inflated and deployed the knee side face restraint airbag covers at least an area of up to and including a radius of 100 mm centered on a position located 200 mm further towards a vehicle rear and 500 mm further towards a vehicle top than an intersection point of a footrest provided in a foot space and a floor panel.

3. The knee side face restraint airbag device of claim 1, wherein:
   an airbag module configured so as to include the inflator and the knee side face restraint airbag is disposed within the instrument panel and is supported through a bracket by an instrument panel reinforcement that extends along the vehicle width direction.

4. The knee side face restraint airbag device of claim 1, wherein:
   the knee side face restraint airbag does not contact a front end portion of a seat cushion of a vehicle seat on which the occupant sits when inflated and deployed.

5. The knee side face restraint airbag device of claim 1, wherein:
   the knee side face restraint airbag abuts a front end portion of a seat cushion of a vehicle seat on which the occupant sits when inflated and deployed.

6. The knee side face restraint airbag device of claim 1, wherein:
   the knee side face restraint airbag is disposed in the folded state so as to face in a vehicle front-rear direction an outside portion in the vehicle width direction of a vehicle seat, and
   the inflator is disposed inside the knee side face restraint airbag.

7. The knee side face restraint airbag device of claim 6, wherein the knee side face restraint airbag is inflated and deployed between an imaginal line X, that runs along the vehicle front-rear direction so as to contact an outside peripheral edge in the vehicle width direction of a steering wheel, and the door trim design face.

8. The knee side face restraint airbag device of claim 6, wherein the inflator has a circular column shape and is disposed substantially along the vehicle up-down direction.

9. The knee side face restraint airbag device of claim 8, wherein an airbag door is provided at an outside location in the vehicle width direction of the instrument panel and is formed with a long narrow rectangle shape in the vehicle up-down direction.

* * * * *